(12) United States Patent
Tan Bergström et al.

(10) Patent No.: US 11,082,193 B2
(45) Date of Patent: *Aug. 3, 2021

(54) WIRELESS TERMINALS, NODES OF WIRELESS COMMUNICATION NETWORKS, AND METHODS OF OPERATING THE SAME

(71) Applicant: Telefonaktiebolaget LM Ericsson (publ), Stockholm (SE)

(72) Inventors: Mattias Tan Bergström, Stockholm (SE); Riikka Susitaival, Helsinki (FI); Magnus Stattin, Upplands Väsby (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 16/558,864

(22) Filed: Sep. 3, 2019

(65) Prior Publication Data

US 2020/0007301 A1 Jan. 2, 2020

Related U.S. Application Data

(63) Continuation of application No. 16/203,450, filed on Nov. 28, 2018, now Pat. No. 10,454,655, which is a
(Continued)

(51) Int. Cl.
*H04L 5/00* (2006.01)
*H04W 52/36* (2009.01)
(Continued)

(52) U.S. Cl.
CPC .......... *H04L 5/0098* (2013.01); *H04L 1/1614* (2013.01); *H04L 5/001* (2013.01);
(Continued)

(58) Field of Classification Search
CPC ........................... H04W 52/327; H04W 72/04
(Continued)

(56) References Cited

U.S. PATENT DOCUMENTS

| 8,538,411 B2 | 9/2013 | Kwon et al. |
| 8,730,829 B2 | 5/2014 | Hwang et al. |

(Continued)

FOREIGN PATENT DOCUMENTS

| CN | 102448157 A | 5/2012 |
| CN | 102595490 A | 7/2012 |

(Continued)

OTHER PUBLICATIONS

Nokia Siemens Networks et al., "PHR remaining issues", Agenda Item 7.1.1.6, Document for: Discussion and Decision, 3GPP TSG-RAN WG2 Meeting #71 bis, R2-105379, Xian, China, Oct. 11-15, 2010, 8 pp.

(Continued)

*Primary Examiner* — Kiet M Doan
(74) *Attorney, Agent, or Firm* — Sage Patent Group

(57) ABSTRACT

According to one embodiment, a method may be provided to operate a wireless terminal in communication with a wireless communication network. A first bit map having a first bit map size is received with bits of the first bit map corresponding to respective component carriers of a first group of component carriers and indicating a status of the respective component carriers of the first group. A second bit map having a second bit map size is received with bits of the second bit map corresponding to respective component carriers of a second group of component carriers and indicating a status of the respective component carriers of the second group. Moreover, the first bit map size of the first bit map is different than the second bit map size of the second bit map.

12 Claims, 17 Drawing Sheets

Related U.S. Application Data continuation of application No. 15/678,199, filed on Aug. 16, 2017, now Pat. No. 10,177,892, which is a continuation of application No. 14/911,875, filed as application No. PCT/SE2015/051191 on Nov. 10, 2015, now Pat. No. 9,787,456.

(60) Provisional application No. 62/149,899, filed on Apr. 20, 2015, provisional application No. 62/102,685, filed on Jan. 13, 2015.

(51) Int. Cl.
| | | |
|---|---|---|
| *H04L 1/16* | (2006.01) | |
| *H04L 12/26* | (2006.01) | |
| *H04L 29/12* | (2006.01) | |

(52) U.S. Cl.
CPC .......... *H04L 43/16* (2013.01); *H04L 61/6022* (2013.01); *H04W 52/365* (2013.01)

(58) Field of Classification Search
USPC ........ 370/329, 336, 241, 252, 335; 455/509, 455/522, 436, 452.1, 450
See application file for complete search history.

(56) References Cited

U.S. PATENT DOCUMENTS

| | | | |
|---|---|---|---|
| 8,798,663 | B2 | 8/2014 | Wang et al. |
| 8,811,322 | B2 | 8/2014 | Feuersanger et al. |
| 9,210,671 | B2 | 12/2015 | Bostrom et al. |
| 9,402,255 | B2 | 7/2016 | Lohr et al. |
| 9,642,161 | B2 | 5/2017 | Wu et al. |
| 2012/0083308 | A1 | 4/2012 | Chen et al. |
| 2012/0113811 | A1 | 5/2012 | Bao et al. |
| 2012/0224552 | A1 | 9/2012 | Feuersanger |
| 2013/0039202 | A1 | 2/2013 | Feuersanger et al. |
| 2013/0114576 | A1 | 5/2013 | Kwon et al. |
| 2013/0215866 | A1 | 8/2013 | Ahn et al. |
| 2013/0242790 | A1 | 9/2013 | Kwon et al. |
| 2013/0329673 | A1* | 12/2013 | Kwon .................. H04W 48/08 370/329 |
| 2014/0050169 | A1 | 2/2014 | Li et al. |
| 2015/0181604 | A1* | 6/2015 | Feuersaenger ........ H04L 5/0055 370/329 |
| 2015/0365937 | A1* | 12/2015 | Etemad ............. H04W 36/0055 370/329 |
| 2016/0127107 | A1 | 5/2016 | Zhang et al. |
| 2019/0150104 | A1 | 5/2019 | Sung et al. |

FOREIGN PATENT DOCUMENTS

| | | |
|---|---|---|
| CN | 102752861 A | 10/2012 |
| CN | 103119996 A | 5/2013 |
| CN | 103391609 A | 11/2013 |
| EP | 2317815 | 5/2011 |
| EP | 2693820 | 2/2014 |
| JP | A2013-179551 | 9/2013 |
| JP | A2015-516695 | 6/2015 |
| RU | 2510595 C2 | 3/2014 |
| RU | 2013102306 A | 7/2014 |
| WO | WO 2011/159222 | 12/2011 |
| WO | WO 2011/159222 A1 | 12/2011 |
| WO | WO 2012/095693 A3 | 7/2012 |
| WO | WO 2012/111980 | 8/2012 |
| WO | WO 2012/165821 | 12/2012 |
| WO | WO 2013/025547 | 2/2013 |
| WO | WO 2013/115263 | 8/2013 |

OTHER PUBLICATIONS

International Search Report and Written Opinion of the International Searching Authority, Application No. PCT/SE2015/051191, dated Feb. 25, 2016.

Ericsson, "Running MAC CR for Carrier Aggregation enhancements", Change Request, 3GPP TSG-RAN WG2 Meeting #91 bis, R2-154910, Malmo, Sweden, Oct. 5-9, 2015, 75 pp.

3GPP, Technical Specification—"3rd Generation Partnership Project; Technical Specification Group Radio Access Network; Evolved Universal Terrestrial Radio Access (E-UTRA); Radio Resource Control (RRC); Protocol specification (Release 12)", 3GPP TS 36.331 V12.4.1 (Dec. 2014), 410 pp.

3GPP, Technical Specification—"3rd Generation Partnership Project; Technical Specification Group Radio Access Network; Evolved Universal Terrestrial Radio Access (E-UTRA); Medium Access Control (MAC) protocol specification (Release 12)", 3GPP TS 36.321 V12.3.0 (Sep. 2014), 57 pp.

3GPP, Technical Specification—"3rd Generation Partnership Project; Technical Specification Group Radio Access Network; Evolved Universal Terrestrial Radio Access (E-UTRA); Physical layer procedures (Release 12)", 3GPP TS 36.213 V12.4.0 (Dec. 2014), 225 pp.

3GPP, Technical Specification—"3rd Generation Partnership Project; Technical Specification Group Radio Access Network; Evolved Universal Terrestrial Radio Access (E-UTRA); Requirements for support of radio resource management (Release 12)", 3GPP TS 36.133 V12.6.0 (Dec. 2014), 992 pp.

3GPP, Technical Specification—"3rd Generation Partnership Project; Technical Specification Group Radio Access Network; Evolved Universal Terrestrial Radio Access (E-UTRA); User Equipment (UE) radio transmission and reception (Release 12)", 3GPP TS 36.101 V12.6.0 (Dec. 2014), 589 pp.

"MAC CE impact due to CA enhancements," 3GPP TSG-RAN WG2 #89bis, Bratislava, Slovakia, Apr. 20-24, 2015, Agenda Item 7.2.3, Ericsson (Tdoc R2-151506) 6 pages.

"New format for Activation/Deactivation MAC Control Element," 3GPP TSG RAN WG2 #89bis, Apr. 20-24, 2015, Bratislava, Slovakia, Agenda Item 7.2.3, Samsung (R2-151620) 2 pages.

Japanese Office Action dated Oct. 5, 2018, Application No. 2017-535645 (Japanese-language document, 3 pages) and English-language Summary of the Office Action, 2 pages.

Search Report (English-Language Translation) Russian Patent Application No. 20171284585/07 (049226) Mar. 6, 2018, 2 pages.

Chinese Office Action for Chinese Patent Application No. 201580077774.7 dated Nov. 18, 2019, 11 Pages.

English Summary Translation of Chinese Office Action for Chinese Patent Application No. 2015800777747.7 dated Nov. 18, 2019, 2 Pages.

Chinese Search Report for Chinese Patent Application No. 2015800777747 dated Nov. 4, 2019, 3 Pages.

Chinese Search Report dated Nov. 4, 2019, Chinese language document, 3 pages.

3GPP TS 36.321 V12.3.0 (Sep. 2014), 3rd Generation Partnership Project; Technical Specification Group Radio Access Network; Evolved Universal Terrestrial Radio Access (E-UTRA); Medium Access Control (MAC) protocol specification (Release 12), pp. 1-57.

* cited by examiner

FIGURE 1

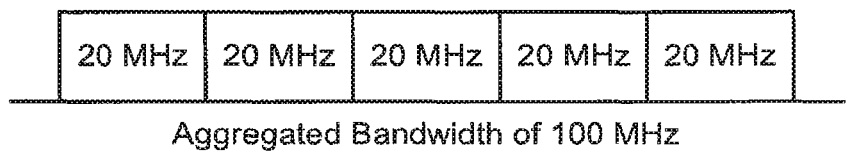

Aggregated Bandwidth of 100 MHz

FIGURE 2A

| Index | LCID values |
|---|---|
| 00000 | CCCH |
| 00001-01010 | Identity of the logical channel |
| 01011-11000 | Reserved |
| 11001 | Extended Power Headroom Report |
| 11010 | Power Headroom Report |
| 11011 | C-RNTI |
| 11100 | Truncated BSR |
| 11101 | Short BSR |
| 11110 | Long BSR |
| 11111 | Padding |

FIGURE 2B

| Index | LCID values |
|---|---|
| 00000 | CCCH |
| 00001-01010 | Identity of the logical channel |
| 01011-11001 | Reserved |
| 11010 | Long DRX Command |
| 11011 | Activation/Deactivation |
| 11100 | UE Contention Resolution Identity |
| 11101 | Timing Advance Command |
| 11110 | DRX Command |
| 11111 | Padding |

FIGURE 2C

| PH | Power Headroom Level |
|----|----------------------|
| 0  | POWER_HEADROOM_0 |
| 1  | POWER_HEADROOM_1 |
| 2  | POWER_HEADROOM_2 |
| 3  | POWER_HEADROOM_3 |
| ... | ... |
| 60 | POWER_HEADROOM_60 |
| 61 | POWER_HEADROOM_61 |
| 62 | POWER_HEADROOM_62 |
| 63 | POWER_HEADROOM_63 |

FIGURE 3

| $C_7$ | $C_6$ | $C_5$ | $C_4$ | $C_3$ | $C_2$ | $C_1$ | R |
|-------|-------|-------|-------|-------|-------|-------|---|
| P | V | \multicolumn{6}{c|}{PH (Type 2, PCell)} |
| R | R | \multicolumn{6}{c|}{$P_{CMAX,c}$ 1} |
| P | V | \multicolumn{6}{c|}{PH (Type 1, PCell)} |
| R | R | \multicolumn{6}{c|}{$P_{CMAX,c}$ 2} |
| P | V | \multicolumn{6}{c|}{PH (Type 1, SCell 1)} |
| R | R | \multicolumn{6}{c|}{$P_{CMAX,c}$ 3} |

...

| P | V | PH (Type 1, SCell n) |
|---|---|----------------------|
| R | R | $P_{CMAX,c}$ m |

FIGURE 4

| C₃₁ | C₃₀ | C₂₉ | C₂₈ | C₂₇ | C₂₆ | C₂₅ | C₂₄ |
|---|---|---|---|---|---|---|---|
| C₂₃ | C₂₂ | C₂₁ | C₂₀ | C₁₉ | C₁₈ | C₁₇ | C₁₆ |
| C₁₅ | C₁₄ | C₁₃ | C₁₂ | C₁₁ | C₁₀ | C₉ | C₈ |
| C₇ | C₆ | C₅ | C₄ | C₃ | C₂ | C₁ | R |
| P | V | PH (Type 2, PCell) ||||||
| R | R | $P_{CMAX,c}$ 1 ||||||
| P | V | PH (Type 1, PCell) ||||||
| R | R | $P_{CMAX,c}$ 2 ||||||
| P | V | PH (Type 1, SCell 1) ||||||
| R | R | $P_{CMAX,c}$ 3 ||||||

...

| P | V | PH (Type 1, SCell n) ||||||
|---|---|---|---|---|---|---|---|
| R | R | $P_{CMAX,c}$ m ||||||

FIGURE 5
| $P_{CMAX,c}$ | Nominal UE transmit power level |
|---|---|
| 0 | PCMAX_C_00 |
| 1 | PCMAX_C_01 |
| 2 | PCMAX_C_02 |
| ... | ... |
| 61 | PCMAX_C_61 |
| 62 | PCMAX_C_62 |
| 63 | PCMAX_C_63 |
FIGURE 6
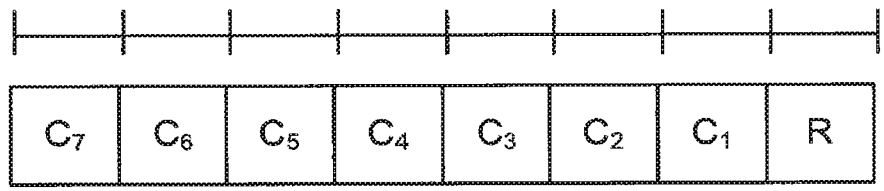
FIGURE 7
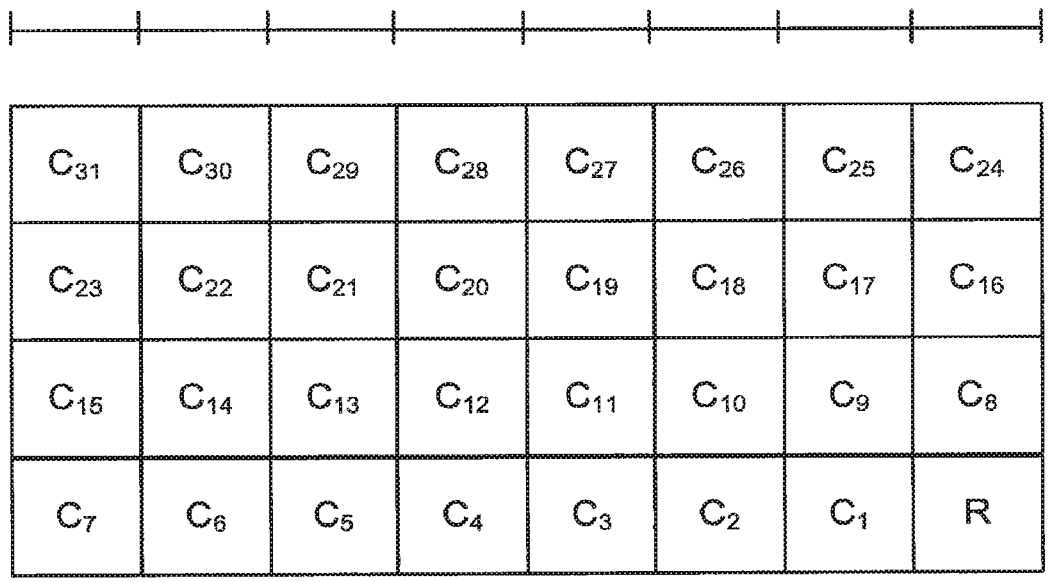

FIGURE 8

| $C_n$ | $C_{n-1}$ | $C_{n-2}$ | $C_{n-3}$ | $C_{n-4}$ | $C_{n-5}$ | $C_{n-6}$ | $C_{n-7}$ |

...

| $C_7$ | $C_6$ | $C_5$ | $C_4$ | $C_3$ | $C_2$ | $C_1$ | R |
|---|---|---|---|---|---|---|---|
| P | V | PH (Type 2, PCell) ||||||
| R | R | $P_{CMAX,c}$ 1 ||||||
| P | V | PH (Type 1, PCell) ||||||
| R | R | $P_{CMAX,c}$ 2 ||||||
| P | V | PH (Type 1, SCell 1) ||||||
| R | R | $P_{CMAX,c}$ 3 ||||||

...

| P | V | PH (Type 1, SCell n) |
|---|---|---|
| R | R | $P_{CMAX,c}$ m |

| $P_{CMAX,c}$ | Nominal UE transmit power level |
|---|---|
| 0 | PCMAX_C_00 |
| 1 | PCMAX_C_01 |
| 2 | PCMAX_C_02 |
| ... | ... |
| 61 | PCMAX_C_61 |
| 62 | PCMAX_C_62 |
| 63 | PCMAX_C_63 |

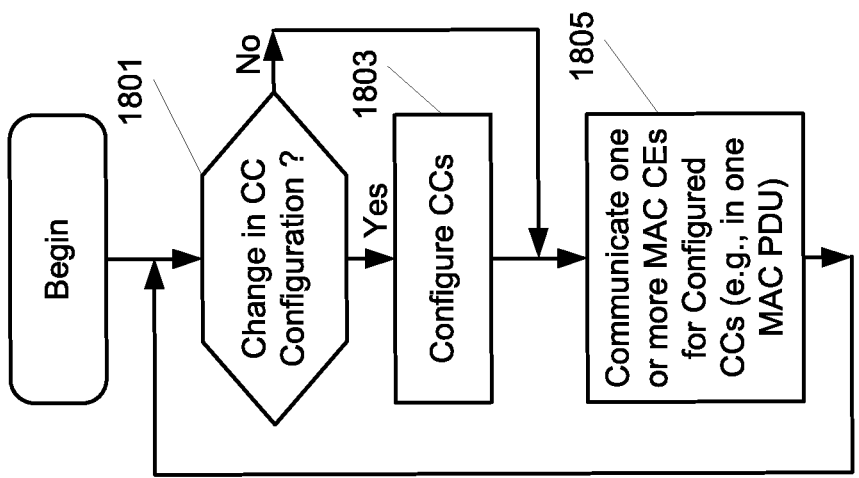
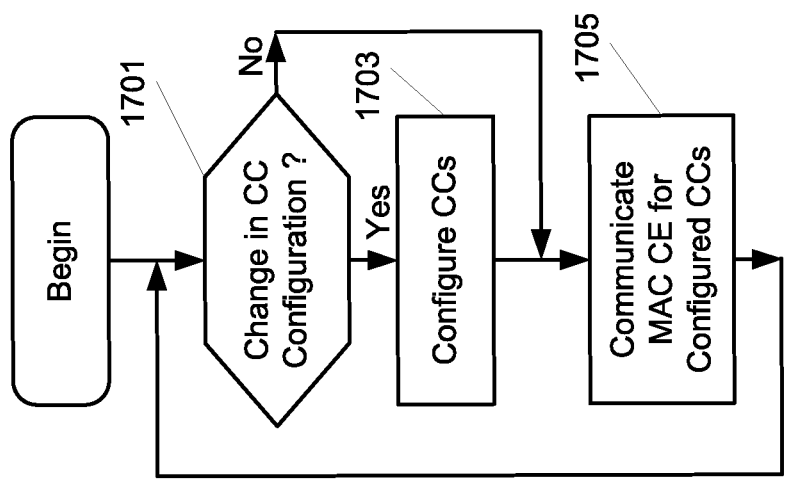
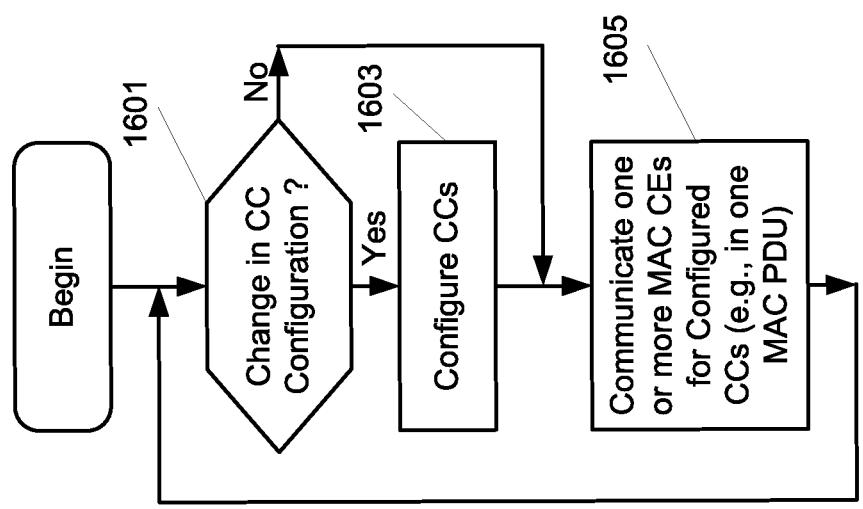

Figure 21A

| C$_7$ | C$_6$ | C$_5$ | C$_4$ | C$_3$ | C$_2$ | C$_1$ | R=0 |
|---|---|---|---|---|---|---|---|
| P | V | \multicolumn{6}{c}{PH (Type 2, PCell)} |
| R | R | \multicolumn{6}{c}{P$_{CMAX,c}$ 1} |
| P | V | \multicolumn{6}{c}{PH (Type 1, PCell)} |
| R | R | \multicolumn{6}{c}{P$_{CMAX,c}$ 2} |
| P | V | \multicolumn{6}{c}{PH (Type 1, SCell 1)} |
| R | R | \multicolumn{6}{c}{P$_{CMAX,c}$ 3} |

...

| P | V | PH (Type 1, SCell n) |
|---|---|---|
| R | R | P$_{CMAX,c}$ m |

Figure 21B

| $C_7$ | $C_6$ | $C_5$ | $C_4$ | $C_3$ | $C_2$ | $C_1$ | R=1 |
|---|---|---|---|---|---|---|---|
| $C_{15}$ | $C_{14}$ | $C_{13}$ | $C_{12}$ | $C_{11}$ | $C_{10}$ | $C_9$ | $C_8$ |
| $C_{23}$ | $C_{22}$ | $C_{21}$ | $C_{20}$ | $C_{19}$ | $C_{18}$ | $C_{17}$ | $C_{16}$ |
| $C_{31}$ | $C_{30}$ | $C_{29}$ | $C_{28}$ | $C_{27}$ | $C_{26}$ | $C_{25}$ | $C_{24}$ |

| P | V | PH (Type 2, PCell) |
|---|---|---|
| R | R | $P_{CMAX,c}$ 1 |
| P | V | PH (Type 1, PCell) |
| R | R | $P_{CMAX,c}$ 2 |
| P | V | PH (Type 2, SCell 1) |
| R | R | $P_{CMAX,c}$ 3 |
| P | V | PH (Type 1, SCell 1) |
| R | R | $P_{CMAX,c}$ 4 |

...

| P | V | PH (Type 2, SCell n) |
|---|---|---|
| R | R | $P_{CMAX,c}$ m - 1 |
| P | V | PH (Type 1, SCell m) |
| R | R | $P_{CMAX,c}$ m |

WIRELESS TERMINALS, NODES OF WIRELESS COMMUNICATION NETWORKS, AND METHODS OF OPERATING THE SAME

CROSS REFERENCE TO RELATED APPLICATIONS

This application is a Continuation of U.S. application Ser. No. 16/203,450, filed on Nov. 28, 2018, which is a Continuation of U.S. application Ser. No. 15/678,199, filed on Aug. 16, 2017, which is a Continuation of U.S. application Ser. No. 14/911,875, filed on Feb. 12, 2016, which is a 35 U.S.C. § 371 national stage application of PCT International Application No. PCT/SE2015/051191, filed on Nov. 10, 2015, which itself claims priority to U.S. provisional Application No. 62/102,685, filed Jan. 13, 2015 and U.S. provisional Application No. 62/149,899, filed Apr. 20, 2015, the disclosure and content of all of which are incorporated by reference herein in their entireties.

TECHNICAL FIELD

Embodiments disclosed herein may be generally directed to wireless communications and more particularly, directed to medium access control (MAC) control elements (CEs) for wireless communications and related wireless terminals and wireless communication network nodes.

BACKGROUND

The Long Term Evolution (LTE) specifications have been standardized to support Component Carrier (CC) bandwidths up to 20 MHz (which may be the maximal LTE Rel-8 carrier bandwidth). Accordingly, LTE operation with bandwidths wider than 20 MHz may be possible and may appear as a number of LTE carriers to an LTE terminal.

A straightforward way to provide such operation could be by means of Carrier Aggregation (CA). CA implies that an LTE Rel-10 terminal can receive multiple Component Carriers CCs (also referred to as carriers), where each CC has (or at least has the possibility to have) the same structure as a Rel-8 carrier. An example of Carrier Aggregation CA is illustrated in FIG. 1.

The LTE standard may support up to 5 aggregated carriers where each carrier is limited in the Radio Frequency RF specifications to have one of six bandwidths, i.e., 6, 15, 25, 50, 75, or 100 Resource Blocks RB (corresponding to 1.4, 3, 5, 10, 15, and 20 MHz respectively).

The number of aggregated Component Carriers CCs as well as the bandwidth of each individual CC may be different for uplink and downlink (generically referred to as wireless communication links, communication links, or simply links). A symmetric configuration refers to the case where the number of CCs in downlink and uplink is the same whereas an asymmetric configuration refers to the case that the numbers of CCs in downlink and uplink are different. A number of CCs configured in the network may be different from a number of CCs seen by a terminal. A terminal may, for example, support and/or be configured with more downlink CCs than uplink CCs, even though the network offers the same number of uplink and downlink CCs.

During initial access, an LTE CA-capable terminal may behave in a manner similar to a terminal not capable of CA. Upon successful connection to the network, a terminal may (depending on its own capabilities and the network) be configured with additional CCs in the UL and DL. Configuration may be based on Radio Resource Control RRC. Due to the heavy signaling and rather slow speed of RRC signaling, it is envisioned that a terminal may be configured with multiple CCs even though not all of them are currently used. If a terminal is activated on multiple CCs, this would imply that it has to monitor all DownLink DL CCs for PDCCH (Physical DownLink Control CHannel) and PDSCH (Physical DownLink Shared CHannel). This operation may require a wider receiver bandwidth, a higher sampling rate, etc., resulting in increased power consumption.

In CA, the terminal is configured with a primary Component Carrier CC (or cell or Serving cell), which is referred to as the Primary Cell or PCell. The PCell may be particularly important, for example, because control signaling may be signaled on this cell and/or because the UE may perform monitoring of the radio quality on the PCell. A CA capable terminal can, as explained above, also be configured with additional component carriers (or cells or serving cells) which are referred to as Secondary Cells (SCells).

The terms terminal, wireless terminal, UE (User Equipment), and User Equipment node will be used interchangeably throughout this document.

In LTE, the eNodeB (also referred to as a base station) and the UE use Medium Access (MAC) Control Elements (CE) to exchange information such as buffer status reports, power headroom reports, etc. A comprehensive list of MAC CEs is provided in section 6.1.3 of 3GPP TS 36.321 v12.3.0 (2014-09), "LTE; Evolved Universal Terrestrial Radio Access (E-UTRA); Medium Access Control (MAC) protocol specification." Moreover, each MAC CE may be identified by a LCID (Logical Channel Identity) which is used as an identifier for the MAC CE so that the receiver interprets the MAC CE correctly. With the existing LTE specification, however, a number of component carriers may be limited.

SUMMARY

According to some embodiments of inventive concepts, a method of operating a wireless terminal in communication with a wireless communication network may include configuring a first group of component carriers for a communication link between the wireless terminal and the communication network, and while configured with the first group of component carriers, a first Medium Access Control (MAC) Control Element (CE) may be communicated. The first MAC CE may include a first bit map having a first bit map size with bits of the first bit map corresponding to respective component carriers of the first group of component carriers. A second group of component carriers may be configured for the communication link between the wireless terminal and the communication network with the first group of component carriers being different than the second group of component carriers. While configured with the second group of component carriers, a second MAC CE may be communicated. The second MAC CE may include a second bit map having a second bit map size with bits of the second bit map corresponding to respective component carriers of the second group of component carriers, and the first bit map size of the first bit map may be different than the second bit map size of the second bit map.

According to some other embodiments of inventive concepts, a method of operating a node of a wireless communication network may include configuring a first group of component carriers for a communication link between the node of the communication network and a wireless terminal. While configured with the first group of component carriers for the communication link, a first MAC CE may be communicated over the communication link, with the first MAC CE including a first bit map having a first bit map size with bits of the first bit map corresponding to respective component carriers of the first group of component carriers. A second group of component carriers may be configured for the communication link between the node of the communication network and the wireless terminal, and while configured with the second group of component carriers, a second MAC CE may be communicated over the communication link. The second MAC CE may include a second bit map having a second bit map size with bits of the second bit map corresponding to respective component carriers of the second group of component carriers, and the first bit map size of the first bit map may be different than the second bit map size of the second bit map.

According to still other embodiments of inventive concepts, a wireless terminal may include a transceiver configured to provide radio communications with a wireless communication network over a radio interface, and a processor coupled with the transceiver. The processor may be configured to configure a first group of component carriers for a communication link between the wireless terminal and the communication network, and to communicate a first MAC CE through the transceiver while configured with the first group of component carriers. The first MAC CE may include a first bit map having a first bit map size with bits of the first bit map corresponding to respective component carriers of the first group of component carriers. The processor may be further configured to configure a second group of component carriers for the communication link between the wireless terminal and the communication network, and to communicate a second MAC CE through the transceiver while configured with the second group of component carriers. The first group of component carriers may be different than the second group of component carriers, the second MAC CE may include a second bit map having a second bit map size with bits of the second bit map corresponding to respective component carriers of the second group of component carriers, and the first bit map size of the first bit map may be different than the second bit map size of the second bit map.

According to yet other embodiments of inventive concepts, a wireless terminal may be adapted to configure a first group of component carriers for a communication link between the wireless terminal and the communication network, and to communicate a first MAC CE while configured with the first group of component carriers. The first MAC CE may include a first bit map having a first bit map size with bits of the first bit map corresponding to respective component carriers of the first group of component carriers. The wireless terminal may be further adapted to configure a second group of component carriers for the communication link between the wireless terminal and the communication network, and to communicate a second MAC CE while configured with the second group of component carriers. The first group of component carriers may be different than the second group of component carriers, the second MAC CE may include a second bit map having a second bit map size with bits of the second bit map corresponding to respective component carriers of the second group of component carriers, and the first bit map size of the first bit map may be different than the second bit map size of the second bit map.

According to some more embodiments of inventive concepts, a node of a wireless communication network may include a transceiver configured to provide communications with one or more wireless terminals over a radio interface, and a processor coupled with the transceiver. The processor may be configured to configure a first group of component carriers for a communication link between the node of the communication network and a wireless terminal, and to communicate a first MAC CE over the communication link while configured with the first group of component carriers for the communication link. The first MAC CE may include a first bit map having a first bit map size with bits of the first bit map corresponding to respective component carriers of the first group of component carriers. The processor may be further configured to configure a second group of component carriers for the communication link between the node of the communication network and the wireless terminal, and to communicate a second MAC CE over the communication link while configured with the second group of component carriers. The second MAC CE may include a second bit map having a second bit map size with bits of the second bit map corresponding to respective component carriers of the second group of component carriers. Moreover, the first bit map size of the first bit map may be different than the second bit map size of the second bit map.

According to yet more embodiments of inventive concepts, a node of a wireless communication network may be adapted to configure a first group of component carriers for a communication link between the node of the communication network and a wireless terminal. The node may be adapted to communicate a first MAC CE over the communication link while configured with the first group of component carriers for the communication link, with the first MAC CE including a first bit map having a first bit map size with bits of the first bit map corresponding to respective component carriers of the first group of component carriers. The node may also be adapted to configure a second group of component carriers for the communication link between the node of the communication network and the wireless terminal, and to communicate a second MAC CE over the communication link while configured with the second group of component carriers. The second MAC CE may include a second bit map having a second bit map size with bits of the second bit map corresponding to respective component carriers of the second group of component carriers, and the first bit map size of the first bit map may be different than the second bit map size of the second bit map.

By providing Medium Access Control Elements (MAC CEs) with bit maps of different sizes, an efficiency of control signaling may be improved while supporting dynamic configuration of different groups of component carriers for a wireless terminal. For example, bit map sizes of MAC CEs communicated between a wireless terminal and a network node may vary depending on the particular component carriers that are configured for the wireless terminal.

BRIEF DESCRIPTION OF THE DRAWINGS

The accompanying drawings, which are included to provide a further understanding of the disclosure and are incorporated in and constitute a part of the application, illustrate certain non-limiting embodiments of inventive concepts. In the drawings:

FIG. 1 is a diagram illustrating carrier aggregation with an aggregated bandwidth of 100 MHz;

FIG. 2A is a table illustrating values of logical channel identifications (LCIDs) for an uplink shared channel (UL-SCH) taken from Table 6.2.1-2 of 3GPP TS 36.321 V12.3.0 (2014-09);

FIG. 2B is a table illustrating values of logical channel identifications (LCIDs) for a downlink shared channel (DL-SCH) taken from Table 6.2.1-1 of 3GPP TS 36.321 V12.3.0 (2014-09);

FIG. 2C is a table illustrating power headroom levels for power headroom reports (PHRs) taken from Table 6.1.3.6-1 of 3GPP TS 36.321 V12.3.0 (2014-09);

FIG. 3 is a table illustrating an extended power headroom report (PHR) medium access control (MAC) control element (CE) taken from Table 6.1.3.6a-2 of 3GPP TS 36.321 V12.3.0 (2014-09);

FIG. 4 is a table illustrating an extended power headroom report (PHR) medium access control (MAC) control element (CE) for 32 cells according to some embodiments of inventive concepts;

FIG. 5 is a table illustrating nominal UE transmit power levels for an extended power headroom report (PHR) taken from Table 6.1.3.6a-1 of 3GPP TS 36.321 V12.3.0 (2014-09);

FIG. 6 is a table illustrating an activation/deactivation medium access control (MAC) control element (CE) taken from Table 6.1.3.8-1 of 3GPP TS 36.321 V12.3.0 (2014-09);

FIG. 7 is a table illustrating an activation/deactivation medium access control (MAC) control element (CE) for 32 cells according to some embodiments of inventive concepts;

FIG. 8 is a table illustrating an extended power headroom report (PHR) medium access control (MAC) control element (CE) according to some embodiments of inventive concepts;

FIGS. 15A, 15B, 15C, 16, 17, and 18 are flow charts illustrating operations of terminals/nodes according to some embodiments of inventive concepts;

FIGS. 21A and 21B are tables illustrating medium access control (MAC) control elements (CEs) according to some embodiments of inventive concepts.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of inventive concepts to those skilled in the art. It should also be noted that these embodiments are not mutually exclusive. Components from one embodiment may be tacitly assumed to be present/used in another embodiment.

For purposes of illustration and explanation only, these and other embodiments of inventive concepts are described herein in the context of operating in a RAN (Radio Access Network) that communicates over radio communication channels with wireless terminals (also referred to as UEs). It will be understood, however, that inventive concepts are not limited to such embodiments and may be embodied generally in any type of communication network. As used herein, a legacy or non-legacy wireless terminal (also referred to as a UE, user equipment node, mobile terminal, wireless device, etc.) can include any device that receives data from and/or transmits data to a communication network, and may include, but is not limited to, a mobile telephone ("cellular" telephone), laptop/portable computer, pocket computer, hand-held computer, an M2M device, IoT (Internet of Things) device, and/or desktop computer.

Note that although terminology from 3GPP (3rd Generation Partnership Project) LTE (Long Term Evolution) has been used in this disclosure to provide examples of embodiments of inventive concepts, this should not be seen as limiting the scope of inventive concepts to only the aforementioned system. Other wireless systems, including WCDMA, WiMax, UMB and GSM, may also benefit from exploiting ideas/concepts covered within this disclosure.

Also, note that terminology such as eNodeB (also referred to as a base station, eNB, etc.) and UE (also referred to as a wireless terminal, mobile terminal, etc.) should be considering non-limiting.

Figure 11:
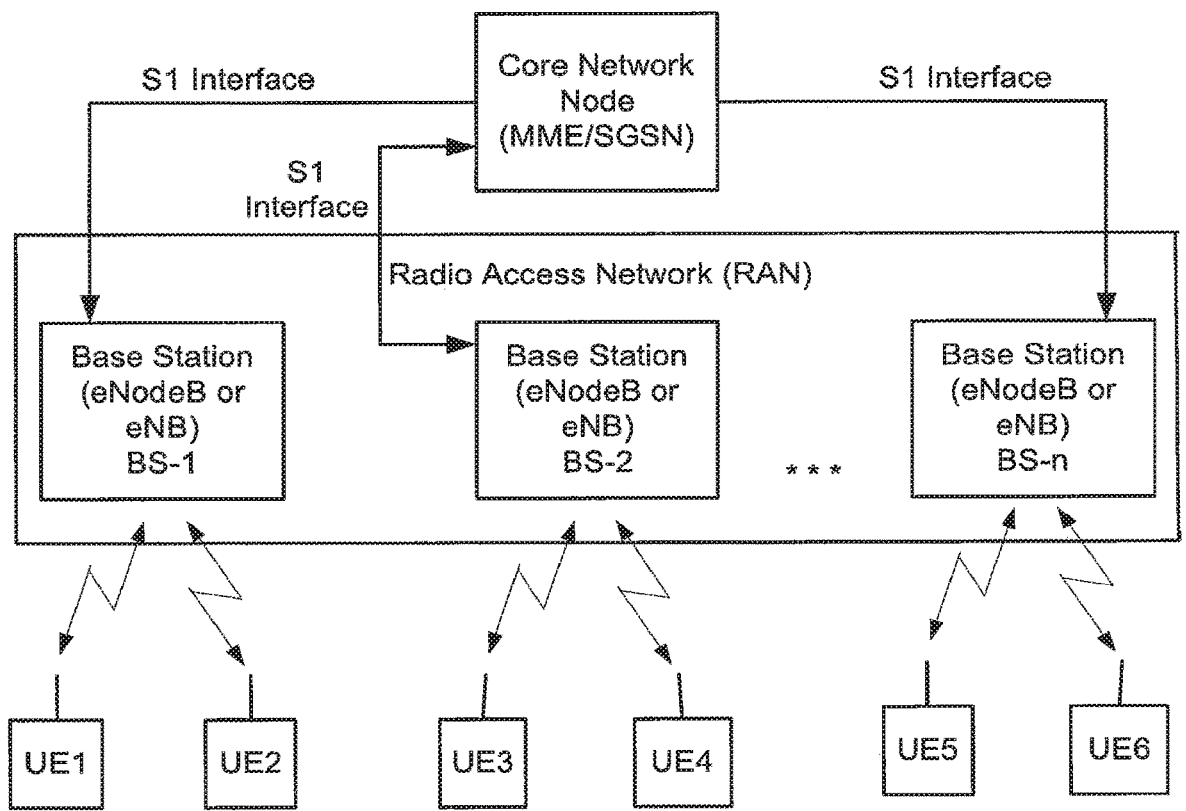
FIG. 11 is a block diagram illustrating elements in a radio access network (RAN) communicating with wireless terminals (UEs) and with a core network node according to some embodiments of inventive concepts.

FIG. 11 is a block diagram illustrating a Radio Access Network (RAN) according to some embodiments of present inventive concepts. As shown, communications between base stations and one or more core network nodes (e.g., Mobility Management Entity MME or Service GPRS Support Node SGSN) may be provided using respective S1 interfaces. Each base station BS may communicate over a radio interface (including uplinks and downlinks) with respective wireless terminals UEs in a respective cell or cells supported by the base station. By way of example, base station BS-1 is shown in communication with wireless terminals UE-1 and UE-2, base station BS-2 is shown in communication with wireless terminals UE-3 and UE-4, and base station BS-n is shown in communication with wireless terminals UE-5 and UE-6.

Figure 12:
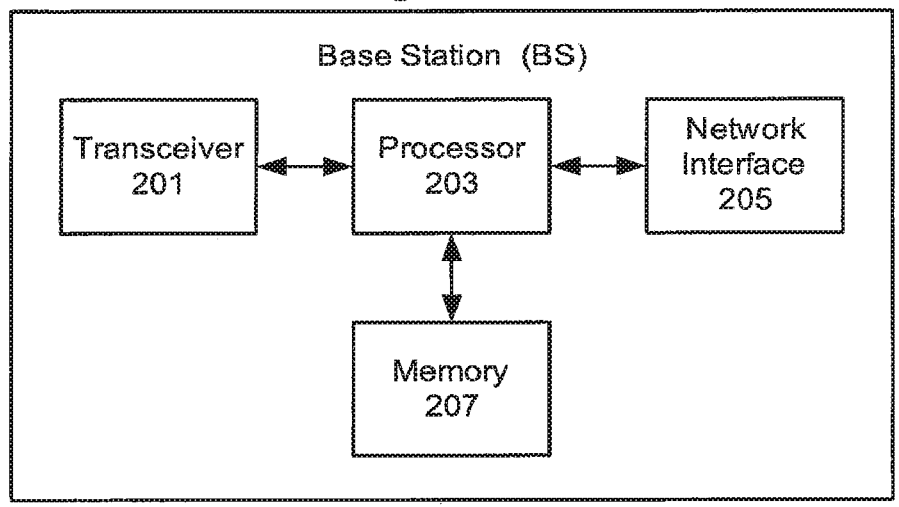
FIG. 12 is a block diagram illustrating a base station of FIG. 11 according to some embodiments of inventive concepts.

FIG. 12 is a block diagram illustrating elements of a base station BS of FIG. 11. As shown, a base station BS may include a transceiver circuit 201 (also referred to as a transceiver or radio interface or a communication interface) configured to provide radio communications with a plurality of wireless terminals, a network interface circuit 205 (also referred to as a network interface) configured to provide communications with other base stations of the RAN (e.g., over the X2 interface), and a processor circuit 203 (also referred to as a processor) coupled to the transceiver circuit and the network interface circuit, and a memory circuit 207 coupled to the processor circuit. The memory circuit 207 may include computer readable program code that when executed by the processor circuit 203 causes the processor circuit to perform operations according to embodiments disclosed herein. According to other embodiments, processor circuit 203 may be defined to include memory so that a memory circuit is not separately provided.

Figure 13:
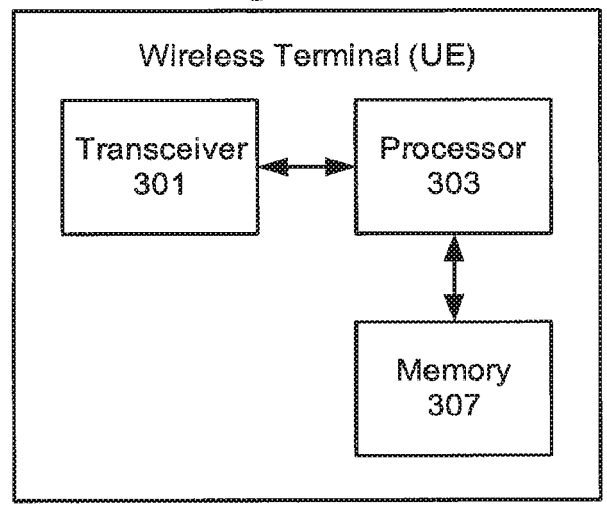
FIG. 13 is a block diagram illustrating a wireless terminal (UE) of FIG. 11 according to some embodiments of inventive concepts.

FIG. 13 is a block diagram illustrating elements of a wireless terminal UE of FIG. 11. As shown, a wireless terminal UE may include a transceiver circuit 301 (also referred to as a transceiver) including a transmitter and a receiver configured to provide radio communications with a base station BS, a processor circuit 303 (also referred to as a processor) coupled to the transceiver circuit, and a memory circuit 307 coupled to the processor circuit. The memory circuit 307 may include computer readable program code that when executed by the processor circuit 303 causes the processor circuit to perform operations according to embodiments disclosed herein. According to other embodiments, processor circuit 303 may be defined to include memory so that a memory circuit is not separately provided.

Figure 14:
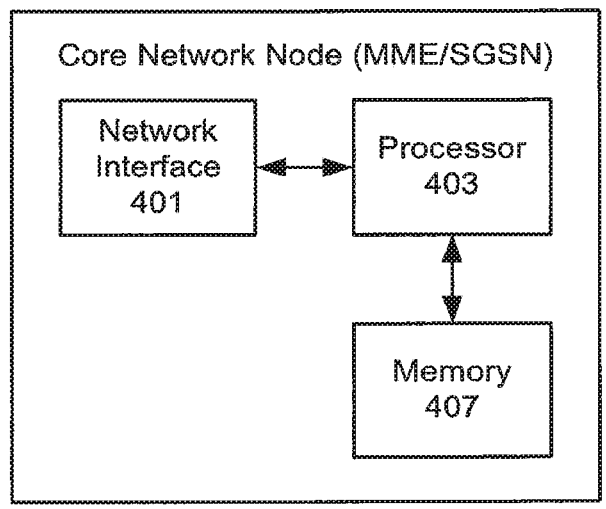
FIG. 14 a block diagram illustrating a core network node of FIG. 11 according to some embodiments of inventive concepts.

FIG. 14 is a block diagram illustrating elements of a core network node (e.g., an MME and/or an SGSN) of FIG. 11. As shown, a core network node may include a network interface circuit 401 (also referred to as a network interface or a communication interface) configured to provide communications with base stations of the RAN (e.g., over the S1 interface), a processor circuit 403 (also referred to as a processor) coupled to the network interface circuit, and a memory circuit 407 coupled to the processor circuit. The memory circuit 407 may include computer readable program code that when executed by the processor circuit 403 causes the processor circuit to perform operations according to embodiments disclosed herein. According to other embodiments, processor circuit 403 may be defined to include memory so that a memory circuit is not separately provided.

In Carrier Aggregation CA for LTE, aggregation of a PCell and up to 4 SCells (i.e., for a total of 5 cells) may currently be supported. Many MAC CEs used in CA may, however, be capable of indicating SCell indices up to 7.

As the demand on throughput increases in LTE systems, it may be beneficial to support aggregation of more than 5 cells. The MAC specification, however, has not been designed to support more than five cells or in some cases more than seven cells). For example, it may not be possible to activate a cell which has a cell index higher than index 7. Therefore, the MAC specification may be a bottleneck to potential throughput.

According to some embodiments of inventive concepts, MAC CEs may be extended to support cell indices higher than 7 to provide a signaling efficient and backwards compatible way of extending the support for the number of carriers in the MAC specification.

According to some embodiments of inventive concepts, multiple versions of MAC CEs may support different number of carriers.

According to some embodiments, MAC CEs may be defined in different versions where the different versions support different numbers of carriers. For example, two different versions of the activation/deactivation MAC CE may be defined, with a first version supporting fewer serving cells (e.g., up to 7 or 8 cells) and with a second version supporting more serving cells (e.g., up to 31 or 32 cells). In one alternative of these embodiments, the different versions of the MAC CEs may have the same Logical Channel Identity (LCID). In another alternative of these embodiments, the different versions of the MAC CEs may have different LCIDs.

Transmitter selection of the version of the MAC CE to send will be discussed below.

Even though the following disclosure may discuss embodiments sending MAC CEs between a UE and an eNB (or a network), it should be appreciated that other embodiments may send MAC CEs between any types of nodes in the network (e.g., between two UEs in case of device-to-device communication). For the sake of simplicity, readability, and/or conciseness, however, transmission of MAC CEs between a UE and a network may be discussed by way of example without discussing transmission of such MAC CEs between other nodes in the network.

Selection may be based on network configuration.

The network may configure the version of the MAC CE to be applied (e.g., the network may indicate to the terminal which version of the MAC CE shall be applied).

The transmitter (e.g., the UE or the network base station) may then select which version of the MAC CEs to transmit depending on what the network has configured the UE to use (send and receive). In other words, if the network has configured the UE to use a first version of the MAC CE, then the UE will select the first version, and the network may also send MAC CEs of the first version to the UE since the UE expects the first version.

The MAC CE version may be configured using broadcast signaling (e.g., via a system information block, SIB) which may have the benefit that all terminals (which support the feature) will apply the same version of the MAC CEs without need for per-UE signaling (which may cost unnecessary signaling overhead). According to other embodiments, the MAC CE version may be configured using dedicated signaling, thereby allowing the network to configure different UEs to apply different versions of the MAC CEs.

Selection may be based on a number of configured carriers.

Which version of the MAC CE is used may be determined based on the number of carriers used in the communication between the UE and network. If a UE and network are communicating using fewer than N carriers, then one version of the MAC CE may be applied, while if N or more carriers are used, another version of the MAC CE may be applied, wherein N is a threshold number of carriers.

In one alternative of this selection mechanism, which version of the MAC CE is used may be determined based on the index of the cell with the highest index which the UE is configured with. If all cells the UE is configured with have an index lower than N, then one version of the MAC CE may be applied, otherwise another version of the MAC CE may be applied.

According to some embodiments, for example, if less than 8 carriers are used, a MAC CE version may be selected which can contain information/indications/etc. about up to 8 (or 7) carriers (i.e. a "non-extended MAC CE version"). If more than 8 carriers are configured, a MAC CE version which can contain information/indications/etc. up to about 32 (or 31) carriers may be selected (i.e. an "extended MAC CE version"). This selection mechanism can be generalized so that multiple levels are used:

if 1 to $N_1$ carriers are used, a first MAC CE version is applied;

if $N_1+1$ to $N_2$ carriers are used, a second MAC CE version is applied;

if $N_2+1$ to $N_3$ carriers are used, a third MAC CE version is applied;

. . .

if $N_{n-1}+1$ to $N_n$ carriers are used, an $n^{th}$ MAC CE version is applied.

Both the network and the UE are aware of the number of carriers (or cells) that are configured for the UE and the indices of the carriers. Accordingly, there may be no need for explicit coordination (e.g., signaling) to determine which MAC CE version should be used. Examples of multiple versions of MAC CEs depending on the number of configured carriers for the terminal are discussed below.

Examples of how two different versions of a MAC CE are used and how the MAC CE versions are selected based on the number of carriers (or cells or serving cells) the UE is configured with will be discussed below. The examples show how this can be implemented in the LTE MAC specification (TS 36.321 V12.3.0).

An extended power headroom reporting MAC CE is discussed according to some embodiments.

According to some embodiments discussed below, the UE may apply one version of the Extended Power Headroom Report MAC Control Element if the UE has no cell configured with a ServCellIndex or SCellIndex (also referred to as a secondary cell index, an SCell index, or a serving cell index) higher than 7, and another version otherwise.

The Extended Power Headroom Report (PHR) MAC control element CE is identified by a MAC PDU (Protocol Data Unit) subheader with LCID (Logical Channel Identity) as specified in the table of FIG. 2A (Table 6.2.1-2 of 3GPP TS 36.321 V12.3.0). The Extended PHR MAC CE may have a variable size and may be defined as shown in the table of FIG. 3 (FIG. 6.1.3.6a-2 of 3GPP TS 36.321 V12.3.0) and in FIG. 4.

As shown in FIG. 3, a first version of the PHR MAC CE may include an 8 bit (1 octet) bit map (also referred to as C-fields) including a plurality of C bits to support one primary component carrier and up to 7 configured secondary component carriers (having secondary component carrier indices 1 to 7). Because a primary component carrier must always be configured and activated and every PHR MAC CE will include a Type 1 report for the primary component carrier, a first bit of the bit map may be reserved R. Each C bit (e.g., $C_1$ to $C_7$) corresponds to a possible component carrier index for a respective secondary component carrier (e.g., $C_1$ for a second component carrier identified by index 1, $C_2$ for a secondary component carrier identified by index 2, . . . , $C_7$ for secondary component carrier identified by index 7. As long as none of the configured secondary component carriers has a component carrier index greater than 7, the first version of the PHR MAC CE may be used. According to some embodiments, secondary component carriers may be configured with non-sequential secondary component carrier indices. For example, three secondary component carriers with indices 1, 3, and 5 may be configured for a wireless terminal so that C bits $C_2$, $C_4$, $C_6$, and $C_7$ are 0 (for non-configured secondary component carriers), so that each of C bits $C_1$, $C_3$, and $C_5$ is 0 if power headroom is not reported for the secondary component carrier or 1 if power headroom is reported for the secondary component carrier.

As shown in FIG. 4, a second version of the PHR MAC CE may include a 32 bit (4 octet) bit map (also referred to as C-fields) to support one primary component carrier and up to 31 configured secondary component carriers (having secondary component carrier indices 1 to 31). Because a primary component carrier must always be configured and activated and every PHR MAC CE will include a Type 1 report for the primary component carrier, a first bit of the bit map may be reserved R. Each C bit (e.g., $C_1$ to $C_{31}$) corresponds to a possible component carrier index for a respective secondary component carrier (e.g., $C_1$ for a second component carrier identified by index 1, $C_2$ for a secondary component carrier identified by index 2, . . . , $C_{31}$ for secondary component carrier identified by index 31.

The second version of the PHR MAC CE may be used any time at least one of the secondary component carriers has a component carrier index greater than 7. According to some embodiments, secondary component carriers may be configured with non-sequential secondary component carrier indices. For example, three secondary component carriers with indices 1, 3, and 13 may be configured for a wireless terminal so that C bits $C_2$, $C_4$-$C_{12}$, and $C_{14}$-$C_{31}$ are 0 (for non-configured secondary component carriers), so that each of C bits $C_1$, $C_3$, and $C_{13}$ is 0 if power headroom is not reported for the secondary component carrier or 1 if power headroom is reported for the secondary component carrier.

By only using the second version of the PHR MAC CE of FIG. 4 when a highest secondary component carrier index for a configured secondary component carrier exceeds a threshold (e.g., a highest secondary component carrier for a configured secondary component carrier is greater than 7), the smaller PHR MAC CE can be used when the highest configured component carrier index does not exceed the threshold, thereby reducing signaling overhead.

If the UE is configured with at least one cell with a ServCellIndex larger than 7, the definition in FIG. 4 may/will be used. Otherwise (if the UE is not configured with at least one cell with a ServCellIndex larger than 7), the definition in FIG. 3 may/will be used. When Type 2 PH is reported, the octet containing the Type 2 PH field is included first after the octet indicating the presence of PH per SCell and is followed by an octet containing the associated $P_{CMAX,c}$ field (if reported). Then follows in ascending order based on the ServCellIndex [3GPP TS 36.331: "Evolved Universal Terrestrial Radio Access (E-UTRA); Radio Resource Control (RRC); Protocol specification"] an octet with the Type 1 PH field and an octet with the associated $P_{CMAX,c}$ field (if reported), for the PCell and for each SCell indicated in the bitmap.

The Extended PHR MAC Control Element may be defined as follows:

$C_i$: this field indicates the presence of a PH field for the SCell with SCellIndex i as specified in [3GPP TS 36.331: "Evolved Universal Terrestrial Radio Access (E-UTRA); Radio Resource Control (RRC); Protocol specification"]. The $C_i$ field set to "1" indicates that a PH field for the SCell with SCellIndex i is reported. The $C_i$ field set to "0" indicates that a PH field for the SCell with SCellIndex i is not reported;

R: reserved bit, set to "0";

V: this field indicates if the PH value is based on a real transmission or a reference format. For Type 1 PH, V=0 indicates real transmission on PUSCH and V=1 indicates that a PUSCH reference format is used. For Type 2 PH, V=0 indicates real transmission on PUCCH and V=1 indicates that a PUCCH reference format is used. Furthermore, for both Type 1 and Type 2 PH, V=0 indicates the presence of the octet containing the associated $P_{CMAX,c}$ field, and V=1 indicates that the octet containing the associated $P_{CMAX,c}$ field is omitted;

Power Headroom (PH): this field indicates the power headroom level. The length of the field is 6 bits. The reported PH and the corresponding power headroom levels are shown in the table of FIG. 2C (Table 6.1.3.6-1 of 3GPP TS 36.321 V12.3.0) (the corresponding measured values in dB can be found in subclause 9.1.8.4 of 3GPP TS 36.133: "Evolved Universal Terrestrial Radio Access (E-UTRA); Requirements for support of radio resource management");

P: this field indicates whether the UE applies power backoff due to power management (as allowed by P-MPRc [3GPP TS 36.101: "Evolved Universal Terrestrial Radio Access (E-UTRA); User Equipment (UE) radio transmission and reception"]). The UE shall set P=1 if the corresponding $P_{CMAX,c}$ field would have had a different value if no power backoff due to power management had been applied;

$P_{CMAX,c}$: if present, this field indicates the $P_{CMAX,c}$ or $P_{CMAX,c}$ [3GPP TR 36.213: "Evolved Universal Terrestrial Radio Access (E-UTRA); Physical Layer Procedures"] used for calculation of the preceding PH field. The reported $P_{CMAX,c}$ and the corresponding nominal UE transmit power levels are shown in FIG. 5 (Table 6.1.3.6a-1 of 3GPP TS 36.321 V12.3.0) (the corresponding measured values in dBm can be found in subclause 9.6.1 of 3GPP TS 36.133: "Evolved Universal Terrestrial Radio Access (E-UTRA); Requirements for support of radio resource management").

FIG. 5 (Table 6.1.3.6a-1 of 3GPP TS 36.321 V12.3.0) is a table illustrating Nominal UE transmit power levels for Extended PHR.

In embodiments discussed below, two Activation/Deactivation MAC Control Element versions may be defined. One version may be provided for the case when the UE has no cell configured with a ServCellIndex (also referred to as a secondary component carrier index or SCellIndex) higher than 7, and another version may be provided otherwise.

The Activation/Deactivation MAC control element is identified by a MAC PDU subheader with LCID as specified in table of FIG. 2B (Table 6.2.1-1 of 3GPP TS 36.321 V12.3.0 (2014-09)). It has a fixed size and consists of a single octet containing seven C-fields and one R-field. The Activation/Deactivation MAC control element is discussed below with respect to a first version illustrated in FIG. 6 (Table 6.1.3.8-1 of 3GPP TS 36.321 V12.3.0 (2014-09)) and a second version illustrated in FIG. 7. If the UE is configured with at least one cell with a ServCellIndex larger than 7, the definition in FIG. 7 may/will be used. Otherwise the definition of FIG. 6 may/will be used.

As shown in FIG. 6, a first version of the Activation/Deactivation MAC CE may include an 8 bit (1 octet) bit map (also referred to as C-fields) to support one primary component carrier and up to 7 configured secondary component carriers (having secondary component carrier indices 1 to 7). Because a primary component carrier must always be configured and activated, a first bit of the bit map may be reserved R. Each C bit (e.g., $C_1$ to $C_7$) corresponds to a possible component carrier index for a respective secondary component carrier (e.g., $C_1$ for a second component carrier identified by index 1, $C_2$ for a secondary component carrier identified by index 2, . . . , $C_7$ for secondary component carrier identified by index 7. As long as none of the configured secondary component carriers has a component carrier index greater than 7, the first version of the Activation/Deactivation MAC CE may be used. According to some embodiments, secondary component carriers may be configured with non-sequential secondary component carrier indices. For example, three secondary component carriers with indices 1, 3, and 5 may be configured for a wireless terminal so that C bits $C_2$, $C_4$, $C_6$, and $C_7$ are 0 (for non-configured secondary component carriers), so that each of C bits $C_1$, $C_3$, and $C_5$ is 0 if the respective secondary component carrier is to be deactivated or 1 if the secondary component carrier is to be activated.

As shown in FIG. 7, a second version of the Activation/Deactivation MAC CE may include a 32 bit (4 octet) bit map (also referred to as C-fields) to support one primary component carrier and up to 31 configured secondary component carriers (having secondary component carrier indices 1 to 31). Because a primary component carrier must always be configured and activated, a first bit of the bit map may be reserved R. Each C bit (e.g., $C_1$ to $C_{31}$) corresponds to a possible component carrier index for a respective secondary component carrier (e.g., $C_1$ for a second component carrier identified by index 1, $C_2$ for a secondary component carrier identified by index 2, . . . , $C_{31}$ for secondary component carrier identified by index 31. The second version of the Activation/Deactivation MAC CE may be used any time at least one of the secondary component carriers has a component carrier index greater than 7. According to some embodiments, secondary component carriers may be configured with non-sequential secondary component carrier indices. For example, three secondary component carriers with indices 1, 3, and 13 may be configured for a wireless terminal so that C bits $C_2$, $C_4$-$C_{12}$, and $C_{14}$-$C_{31}$ are 0 (for non-configured secondary component carriers), so that each of C bits $C_1$, $C_3$, and $C_{13}$ is 0 if the secondary component carrier is to be deactivated or 1 if the secondary component carrier is to be activated.

By only using the second version of the Activation/Deactivation MAC CE of FIG. 7 when a highest secondary component carrier index for a configured secondary component carrier exceeds a threshold (e.g., a highest secondary component carrier for a configured secondary component carrier is greater than 7), the smaller Activation/Deactivation MAC CE can be used when the highest configured component carrier index does not exceed the threshold, thereby reducing signaling overhead.

Definitions of elements of FIGS. 6 and 7 are provided as follows:

$C_i$: if there is an SCell configured with SCellIndex i as specified in [3GPP TS 36.331: "Evolved Universal Terrestrial Radio Access (E-UTRA); Radio Resource Control (RRC); Protocol specification"], this field indicates the activation/deactivation status of the SCell with SCellIndex i, else the UE shall ignore the $C_i$ field. The $C_i$ field is set to "1" to indicate that the SCell with SCellIndex i shall be activated. The $C_i$ field is set to "0" to indicate that the SCell with SCellIndex i shall be deactivated;

R: Reserved bit, set to "0".

According to some other embodiments, the same MAC CE (or "MAC CE version" if the wording from embodiments discussed above should be used) is applied regardless of the number of carriers which are used/signaled/indicated. The same LCID is therefore also used. However, the size of the MAC CE may change based on the number of carriers, or more specifically, a number of bits (and therefore may be also the number of octets) used to indicate cells may change dynamically based on a number of carriers which is used.

This can be implemented by changing the number of octets used to refer to serving cells in the MAC CE (i.e., the bit map or C-fields). For example, if all serving cells the UE is configured with have indices lower than 7 (or 8) only one octet is needed, but if the UE is configured with at least one cell with an index higher than 7 but lower than 15, two octets are needed. More generally, the number of octets used will be a ceiling((index+1)/8) where index is the highest serving cell index (or secondary cell index) the UE is configured with. And ceiling(x) is a function providing the closest highest integer value of x. (Note that if the lowest index is 1, the "+1" in the formula may not be needed).

The difference between this embodiment and embodiments discussed above with the selection mechanism based on number of configured carriers is that with this embodiment, the number of bits used to indicate carriers may be reduced and/or kept at a minimum Consider, for example, the case when the UE is configured with a serving cell with index 9. According to this embodiment, only two octets will be used to indicate cells. In embodiments described above with the selection mechanism based on number of configured carriers, the UE will apply the extended MAC CE version which may use 4 octets to indicate cells. Hence this embodiment may be more signaling efficient.

According to some embodiments of inventive concepts, MAC CEs may have dynamic size with the size depending on the number of configured carriers for the terminal.

In embodiments discussed below, a MAC CE may be used in which, depending on the number of serving cells which are used, the number of C-fields (fields used to indicate SCell indices) changes depending on the highest cell index that the UE is configured with.

The Extended Power Headroom Report (PHR) MAC control element is identified by a MAC PDU subheader with LCID as specified in FIG. 2A. It has a variable size and is defined in FIG. 3. When Type 2 PH is reported, the octet containing the Type 2 PH field is included first after the octet(s) indicating the presence of PH per SCell and followed by an octet containing the associated $P_{CMAX,c}$ field (if reported). The UE shall include enough octet(s) for indicating presence of PH per SCell, such that the configured SCell with the highest index can be indicated. Then follows in ascending order based on the ServCellIndex [3GPP TS 36.331: "Evolved Universal Terrestrial Radio Access (E-UTRA); Radio Resource Control (RRC); Protocol specification"] an octet with the Type 1 PH field and an octet with the associated $P_{CMAX,c}$ field (if reported), for the PCell and for each SCell indicated in the bitmap.

The Extended PHR MAC Control Element is defined as follows:

$C_i$: this field indicates the presence of a PH field for the SCell with SCellIndex i as specified in [3GPP TS 36.331: "Evolved Universal Terrestrial Radio Access (E-UTRA); Radio Resource Control (RRC); Protocol specification".]. The $C_i$ field set to "1" indicates that a PH field for the SCell with SCellIndex i is reported. The $C_i$ field set to "0" indicates that a PH field for the SCell with SCellIndex i is not reported;

R: reserved bit, set to "0";

V: this field indicates if the PH value is based on a real transmission or a reference format. For Type 1 PH, V=0 indicates real transmission on PUSCH and V=1 indicates that a PUSCH reference format is used. For Type 2 PH, V=0 indicates real transmission on PUCCH and V=1 indicates that a PUCCH reference format is used. Furthermore, for both Type 1 and Type 2 PH, V=0 indicates the presence of the octet containing the associated $P_{CMAX,c}$ field, and V=1 indicates that the octet containing the associated $P_{CMAX,c}$ field is omitted;

Power Headroom (PH): this field indicates the power headroom level. The length of the field is 6 bits. The reported PH and the corresponding power headroom levels are shown in the table of FIG. 2C (Table 6.1.3.6-1 of 3GPP 36.321 V12.3.0) (the corresponding measured values in dB can be found in subclause 9.1.8.4 of [3GPP TS 36.133: "Evolved Universal Terrestrial Radio Access (E-UTRA); Requirements for support of radio resource management"]);

P: this field indicates whether the UE applies power backoff due to power management (as allowed by P-MPR$_c$ [3GPP TS 36.101: "Evolved Universal Terrestrial Radio Access (E-UTRA); User Equipment (UE)

radio transmission and reception"]). The UE shall set P=1 if the corresponding $P_{CMAX,c}$ field would have had a different value if no power backoff due to power management had been applied;

$P_{CMAX,c}$: if present, this field indicates the $P_{CMAX,c}$ or $P_{CMAX,c}$ [3GPP TR 36.213: "Evolved Universal Terrestrial Radio Access (E-UTRA); Physical Layer Procedures"] used for calculation of the preceding PH field. The reported $P_{CMAX,c}$ and the corresponding nominal UE transmit power levels are shown in the table of FIG. 5 (Table 6.1.3.6a-1 of 3GPP TS 36.321 V12.3.0) (the corresponding measured values in dBm can be found in subclause 9.6.1 of [3GPP TS 36.133: "Evolved Universal Terrestrial Radio Access (E-UTRA); Requirements for support of radio resource management"]).

FIG. 8 illustrates an Extended PHR MAC Control Element according to some embodiments of inventive concepts.

Figures 9, 10:
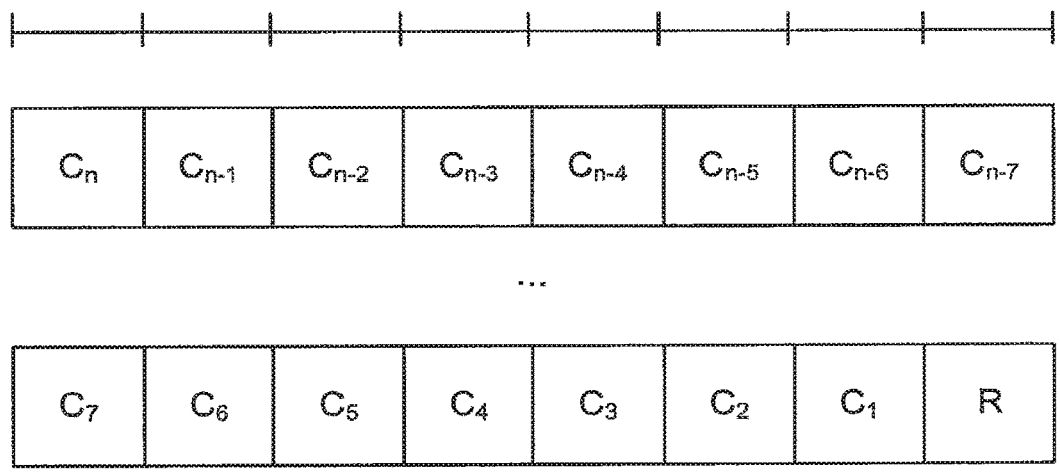
FIG. 9 is a table illustrating nominal UE transmit power levels for an extended power headroom report (PHR) taken from Table 6.1.3.6a-1 of 3GPP TS 36.321 V12.3.0 (2014-09)
FIG. 10 is a table illustrating an activation/deactivation medium access control (MAC) control element (CE) according to some embodiments of inventive concepts.

The table of FIG. 9 (Table 6.1.3.6a-1 of 3GPP TS 36.321 V12.3.0) illustrates Nominal UE transmit power levels for Extended PHR.

In embodiments discussed below, a MAC CE is used in which, depending on the number of serving cells which is/are used, the number of octets with C-fields (fields used to indicate SCell indices) changes depending on what the highest cell index the UE is configured with.

The Activation/Deactivation MAC control element is identified by a MAC PDU subheader with LCID as specified in the table of FIG. 2B. It has a dynamic size and includes one or more octet(s) containing up to 32 C-fields and one R-field. The Activation/Deactivation MAC control element is defined as discussed with respect to FIG. 10. The number of octet(s) shall be such that it is sufficient to indicate activation/deactivation status of the SCell with the highest SCellIndex.

$C_i$: if there is an SCell configured with SCellIndex i as specified in [3GPP TS 36.331: "Evolved Universal Terrestrial Radio Access (E-UTRA); Radio Resource Control (RRC); Protocol specification"], this field indicates the activation/deactivation status of the SCell with SCellIndex i, else the UE shall ignore the $C_i$ field. The $C_i$ field is set to "1" to indicate that the SCell with SCellIndex i shall be activated. The $C_i$ field is set to "0" to indicate that the SCell with SCellIndex i shall be deactivated;

R: Reserved bit, set to "0".

FIG. 10 illustrates an Activation/Deactivation MAC control element according to some embodiments of inventive concepts.

According to some embodiments, the transmitter may send a set/list of MAC CEs of a certain type wherein each MAC CE in the list has the capacity to address few cells, but together the set/list of MAC CEs of the same type will address more cells. Stated in other words, the first MAC CE in the list may address a first set of cells, the second MAC CE in the list may address a second set of cells, the third MAC CE in the list may address a third set of cells, and so on. Stated in other words, concatenation of MAC CEs may be used.

Consider for example that the network should send activation/deactivation-commands to the UE and each activation/deactivation MAC CE can address 8 (or 7) cells. If in total 32 cells shall be addressed, the network would then send four activation/deactivation MAC CEs where:

the first activation/deactivation MAC CE addresses cells with index 0-7 (or 1-7);

the second activation/deactivation MAC CE addresses cells with index 8-15;

the third activation/deactivation MAC CE addresses cells with index 16-23; and the fourth activation/deactivation MAC CE addresses cells with index 24-31.

The order could also be reversed such that:

the first activation/deactivation MAC CE addresses cells with index 24-31;

the second activation/deactivation MAC CE addresses cells with index 16-23;

the third activation/deactivation MAC CE addresses cells with index 8-15; and the fourth activation/deactivation MAC CE addresses cells with index 0-7 (or 1-7).

In this embodiment, it could be so that the MAC CEs must be signaled in the same block of messages (e.g., a same MAC PDU). The UE may reject the set of MAC CEs (or apply another behavior) if the number of MAC CEs in a MAC PDU are too few in order to be able to address all configured service cells of the UE, e.g., if the UE is configured with service cells with indices 0 (e.g., the PCell), 3, 4, and 18, three MAC CEs may be needed to address service cells with indices up to 18. Similarly, the UE may reject the set of MAC CEs (or apply another behavior) if the number of MAC CEs in a MAC PDU are too many and hence addressing more cells than the UE is configured with.

According to some embodiments of inventive concepts, different versions of MAC CEs are introduced where the different versions support different number of carriers. According to some other embodiments of inventive concepts, dynamic MAC CEs are introduced which can dynamically change the number of supported carriers which can be indicated. According to still other embodiments of inventive concepts, multiple MAC CEs of a certain type are concatenated/sent at the same time where each MAC CE can address few cells but together the multiple MAC CEs can address more cells.

Figure 15A:
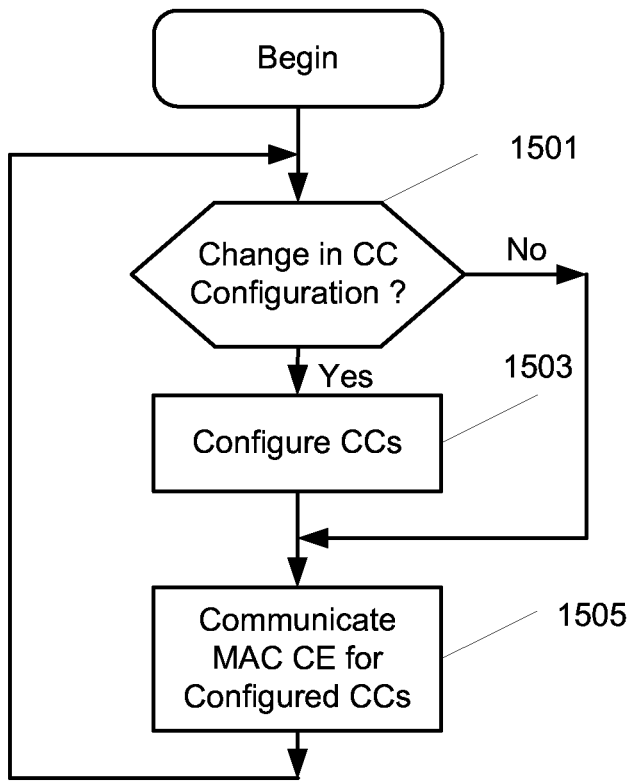

Operations of wireless terminal UE according to some embodiments will now be discussed with respect to the flowchart of FIGS. 15A, 15B, and 15C. At block 1501, wireless terminal UE processor 303 may determine if a change of component carriers should occur, for example, based on instructions received from base station BS through transceiver 301. If a change in component carrier configuration should occur at block 1501, processor 303 may configure the component carriers at block 1503, and MAC CEs may be communicated with base station BS in accordance with the configured CCs at block 1505.

The configured CCs for wireless terminal UE may include a primary CC and zero, one, or a plurality of secondary CCs, and a secondary component carrier index may be associated with each secondary component carrier as discussed above. Moreover, each PHR or Activation/Deactivation MAC CE may include a bit map with each secondary component carrier index of the configured secondary component carriers being associated with a respective bit of the bit map. As discussed above with respect to FIGS. 3 and 4, FIGS. 6 and 7, and FIGS. 8 and 10, a size of the MAC CE bit map may change to accommodate a highest secondary component carrier index of the configured component carriers.

Accordingly, processor 301 may configure a first group of component carriers for a communication link between wireless terminal UE and a base station BS of the communication network at block 1503. While configured with the first group of component carriers (e.g., until there is a change in CC configuration at block 1501), processor 301 may communicate a first Medium Access Control (MAC) Control Element (CE) at block 1505 (e.g., a PHR MAC CE or an Activation/Deactivation MAC CE), with the first MAC CE including a first bit map having a first size with bits of the first bit map corresponding to respective component carriers of the first group of component carriers. As indicated by the loop from block 1505 to block 1501 and back to block 1505 (bypassing block 1503) any number of MAC CEs may be communicated while configured with the first group of component carriers.

Responsive to a change in CC configuration at block 1501, processor 301 may configure a second group of component carriers for the communication link between the wireless terminal and the base station BS of the communication network, with the second group of component carriers being different than the first group of component carriers. While configured with the second group of component carriers (e.g., until there is another change in CC configuration at block 1501), processor 301 may communicate a second MAC CE at block 1505 (e.g., a PHR MAC CE or an Activation/Deactivation MAC CE), with the second MAC CE including a second bit map having a second size with bits of the second bit map corresponding to respective component carriers of the second group of component carriers. Moreover, sizes of the first and second bit maps may be different to accommodate the different groups of configured component carriers. As indicated by the loop from block 1505 to block 1501 and back to block 1505 (bypassing block 1503) any number of MAC CEs may be communicated while configured with the second group of component carriers.

As used herein, a group of component carriers for a wireless terminal UE may include a primary component carrier and zero, one, or a plurality of secondary component carriers, and each secondary component carrier may be identified using a secondary component carrier index that is associated with a respective bit (e.g., a C-bit) of the bit map included in a MAC CE (e.g., a bit map of a PHR MAC CE or an Activation/Deactivation MAC CE). Two different groups of component carriers for a same wireless terminal UE (e.g., the first and second groups of component carriers discussed above with respect to block 1501) may thus include a same primary component carrier with at least one of the groups including at least one secondary component carrier that is not included in the other group. For example, a first group of component carriers may include the primary CC and two secondary CCs with respective indices associated with C-bits $C_2$ and $C_4$ (so that a one octet bit map of FIG. 3, 6, 8, or 10 may be used with the first group), and the second group of CCs may include the primary CC and three secondary CCs with respective indices associated with C-bits $C_2$, $C_4$, and $C_{12}$ (so that a multiple/2 octet bit map of FIG. 4, 7, 8, or 10 may be used for the second group). Different groups of CCs for a wireless terminal may thus share some of the same primary and/or secondary CCs. Moreover, sizes of different groups of CCs for a wireless terminal may be the same (i.e., having a same number of component carriers), but different highest secondary CC indices for the two groups may result in MAC CE bit maps of different sizes. For example, a first group of component carriers may include the primary CC and two secondary CCs with respective indices associated with C-bits $C_2$ and $C_4$ (so that a one octet bit map of FIG. 3, 6, 8, or 10 may be used with the first group), and the second group of CCs may include the primary CC and two secondary CCs with respective indices associated with C-bits $C_2$ and $C_{12}$ (so that a multiple/2 octet bit map of FIG. 4, 7, 8, or 10 may be used for the second group).

Accordingly, configuring the first group of component carriers may thus include configuring a primary component carrier and a first group of secondary component carriers, configuring the second group of component carriers may include configuring a primary component carrier and a second group of secondary component carriers, the first and second groups of secondary component carriers may be different, each of the first group of secondary component carriers may correspond to a respective bit of the first bit map, and each of the second group of secondary component carriers may correspond to a respective bit of the second bit map. Moreover, a respective component carrier index may be associated with each secondary component carrier of the first group, a respective component carrier index may be associated with each secondary component carrier of the second group, at least one of the component carrier indices of the secondary component carriers of the first group may exceed a threshold, none of the component carrier indices of the secondary component carriers of the second group may exceed the threshold, and the size of the first bit map may be greater than the size of the second bit map.

Figure 15B:
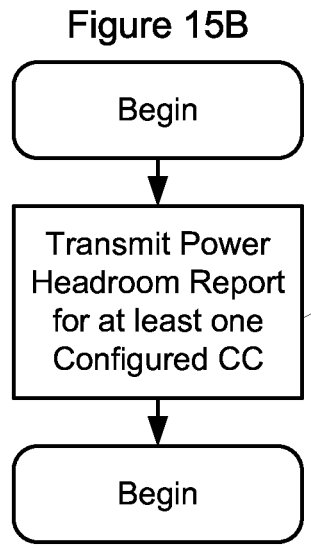
Figure 15C:
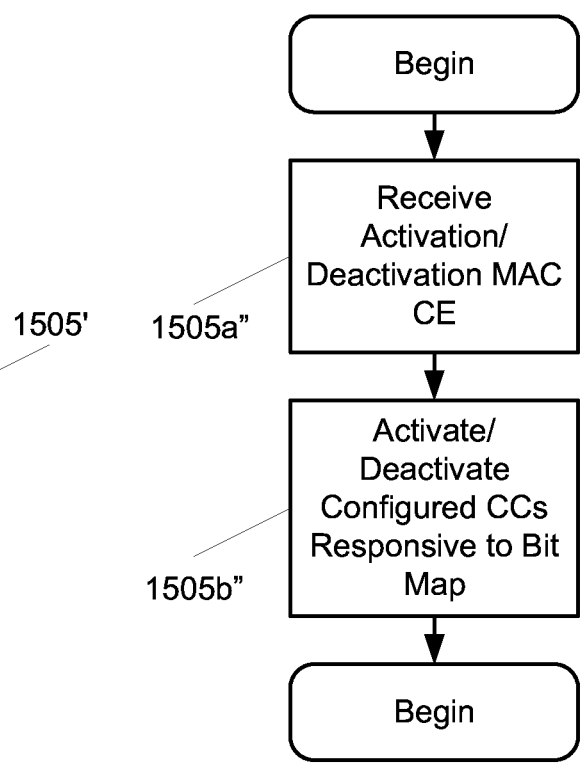

If a MAC CE of block 1505 is a PHR MAC CE, communicating the PHR MAC CE may include transmitting (through transceiver 301) a power headroom report for at least one of the configured CCs at block 1505' of FIG. 15B.

If a MAC CE of block 1505 is an Activation/Deactivation MAC CE, communicating the Activation/Deactivation MAC CE may include receiving (through transceiver 301) the Activation/Deactivation MAC CE at block 1505a" and activating/deactivating each component carrier of the first group of component carriers responsive to the first bit map at block 1505b".

According to some embodiments, different Logical Channel Identities (LCID) may be used for different MAC CEs of the same type having different bit map sizes (e.g., different PHR MAC CEs having different bit map sizes or different Activation/Deactivation MAC CEs having different bit map sizes). For example, communicating a first MAC CE at block 1505 may include receiving the first MAC CE and applying bits of the first bit map to respective component carriers of a first group of component carriers responsive to a first LCID, and communicating a second MAC CE may include receiving the second MAC CE and applying bits of the second bit map to respective component carriers of a second group of component carriers responsive to a second LCID (different than the first LCID). According to another example, communicating a first MAC CE at block 1505 may include transmitting the first MAC CE with a first LCID to indicate that bits of the first bit map apply to respective component carriers of a first group of component carriers, and communicating a second MAC CE may include transmitting the second MAC CE with a second LCID (different than the first LCID) to indicate that bits of the second bit map apply to respective component carriers of a second group of component carriers.

According to other embodiments, the same LCID may be provided for different MAC CEs of a same type having different bit map sizes. In such cases, processor 303 may determine the appropriate bit map size based on the current configuration of component carriers. For example, communicating the first MAC CE at block 1505 may include interpreting/generating the first MAC CE to include the first bit map having the first size responsive to the first group of component carriers configured for the communication link, and communicating the second MAC CE at block 1505 may include interpreting/generating the second MAC CE to include the second bit map having the second size responsive to the second group of component carriers configured for the communication link.

According to some other embodiments of inventive concepts, one or more MAC CEs of a same type (e.g., one or more PHR MAC CEs, or one or more Activation/Deactivation MAC CEs) and having a same bit map size (e.g., one octet) may be used for a same group of component carriers to accommodate different CC configurations, and the one or more MAC CEs for a same group of CCs may be included in a same MAC PDU. For a power headroom report PHR, for example, if indices of the group of configured CCs can be accommodated in a one octet bit map, one PHR MAC CE of FIG. 3 may be included in the MAC PDU for the power headroom report. If indices of the group of configured CCs cannot be accommodated in a one octet bit map, two or more PHR MAC CEs of FIG. 3 may be included in the MAC PDU for the power headroom report. For an Activation/Deactivation instruction, for example, if indices of the group of configured CCs can be accommodated in a one octet bit map, one Activation/Deactivation MAC CE of FIG. 6 may be included in the MAC PDU for the Activation/Deactivation instruction. If indices of the group of configured CCs cannot be accommodated in a one octet bit map, two or more Activation/Deactivation MAC CEs of FIG. 6 may be included in the MAC PDU for the Activation/Deactivation instruction.

As illustrated in the flowchart of FIG. 16, wireless terminal UE processor 303 may determine if a change of component carriers should occur at block 1601, for example, based on instructions received from base station BS through transceiver 301. If a change in component carrier configuration should occur at block 1601, processor 303 may configure the component carriers at block 1603, and MAC CEs may be communicated with base station BS in accordance with the configured CCs at block 1605.

Accordingly, processor 303 may initially configure a first group of component carriers for a communication link between the wireless terminal and the communication network at block 1603. While configured with the first group of component carriers, processor 303 may communicate (e.g., transmit and/or receive through transceiver 301) first and second Medium Access Control (MAC) Control Elements (CEs). The first MAC CE may include a first bit map with bits of the first bit map corresponding to respective component carriers of a first sub-set of the group of component carriers, and the second MAC CE may include a second bit map with bits of the second bit map corresponding to respective component carriers of a second sub-set of the group of component carriers. The first and second MAC CEs, for example, may be first and second PHR MAC CEs of FIG. 3, or the first and second MAC CEs may be first and second Activation/Deactivation MAC CEs of FIG. 6, and the first and second MAC CEs may be included in a same MAC PDU.

As long as the configuration of CCs remains unchanged at block 1601, processor 303 may loop through operations of blocks 1601 and 1605 using multiple MAC CEs in a MAC PDU with one MAC CE of the PDU providing information for a first sub-set of the configured CCs and another MAC CE of the PDU providing information for a second sub-set of the configured CCs, with the first and second sub-sets being mutually exclusive.

If there is a change in CC configuration at block 1601, processor 303 may configure a second group of component carriers for a communication link between the wireless terminal and the communication network at block 1603, with the second group of component carriers being different than the first group of component carriers. For example, a one octet bit map may be sufficient to accommodate indices of the second group of carriers. While configured with the second group of component carriers, processor 303 may communicate a third MAC CE (through transceiver 301), with the third MAC CE including a third bit map with bits of the third bit map corresponding to respective component carriers of the second group of component carriers. Moreover, the third MAC CE may be included in a second MAC PDU different than the MAC PDU used for the first and second MAC CEs discussed above with respect to block 1605.

The first, second, and third bit maps (of the first, second, and third MAC CEs discussed above with respect to block 1605) may have a same size. Moreover, the first group of component carriers may include a primary component carrier and a first plurality of secondary component carriers, each of the first sub-set of the first plurality of secondary component carriers may be correspond to a respective bit (C-bit) of the first bit map, and each of the second sub-set of the first plurality of secondary component carriers may correspond to a respective bit (C-bit) of the second bit map. In addition, the second group of component carriers may include the primary component carrier and a second plurality of secondary component carriers, with each of the plurality of secondary component carriers corresponding to a respective one of the bits of the third bit map.

FIG. 17 illustrates operations of base station BS according to some embodiments of inventive concepts corresponding to wireless terminal operations of FIG. 15A. Processor 203 may determine whether a change in CC configuration is appropriate for wireless terminal UE at block 1701, and if so, processor 203 may configure component carriers CCs for wireless terminal UE at block 1703 by transmitting (through transceiver 201) instructions for the CC configuration to wireless terminal UE. At block 1705, processor 203 may communicate MAC CEs with wireless terminal UE for the configured CCs (e.g., transmit Activation/Deactivation MAC CEs and/or receive PHR MAC CEs).

At block 1703, for example, processor 203 may configure a first group of component carriers for a communication link between the node of the communication network and a wireless terminal (e.g., by transmitting a CC configuration instruction to wireless terminal UE through transceiver 201). While configured with the first group of component carriers for the communication link, processor 203 may communicate a first Medium Access Control (MAC) Control Element (CE) (e.g., transmit an Activation/Deactivation MAC CE or receive a PHR MAC CE) over the communication link at block 1705 with wireless terminal UE, with the first MAC CE including a first bit map having a first size (e.g., no more than one octet) with bits of the first bit map corresponding to respective component carriers of the first group of component carriers. Any number of MAC CEs may be transmitted/received for the first group of component carriers at block 1705 until the CC configuration changes at blocks 1701 and 1703.

Responsive to determining that the CC configuration of wireless terminal UE should change at block 1701, processor 203 may configure a second group of component carriers for the communication link between the node of the communication network and the wireless terminal. While configured with the second group of component carriers, processor 203 may communicate a second MAC CE over the communication link, with the second MAC CE including a second bit map having a second size (e.g., more than one octet), with bits of the second bit map corresponding to respective component carriers of the second group of component carriers, and with the first size of the first bit map being different than the second size of the second bit map. Groups of component carriers are discussed in greater detail above with respect to FIGS. 15A, 15B, and 15C.

According to some embodiments, communicating at block 1705 the first MAC CE may include receiving a first Extended Power Head Room, PHR, MAC CE (through transceiver 201), and communicating the second MAC CE at block 1705 may include receiving a second Extended PHR MAC CE (through transceiver 201).

According to some embodiments, communicating the first MAC CE at block 1705 may include transmitting a first Activation/Deactivation MAC CE, and communicating the second MAC CE may include transmitting a second Activation/Deactivation MAC CE. For example, communicating the first MAC CE may include transmitting the first Activation/Deactivation MAC CE to activate/deactivate each component carrier of the first group of component carriers in accordance with the first bit map, and communicating the second MAC CE may include transmitting the second Activation/Deactivation MAC CE to activate/deactivate each component carrier of the second group of component carriers in accordance with the second bit map.

According to some embodiments, a first Logical Channel Identity (LCID) may be provided for the first MAC CE, a second LCID may provided for the second MAC CE, and the first and second LCIDs may be different. For example, communicating the first MAC CE may include receiving the first MAC CE (e.g., a first PHR MAC CE) and applying bits of the first bit map to respective component carriers of the first group of component carriers responsive to the first LCID, and communicating the second MAC CE may include receiving the second MAC CE (e.g., a second PHR MAC CE) and applying bits of the second bit map to respective component carriers of the second group of component carriers responsive to the second LCID.

According to some other embodiments, a first Logical Channel Identity (LCID) may be provided for the first MAC CE, a second LCID may be provided for the second MAC CE, and the first and second LCIDs may be the same. Communicating the first MAC CE may include interpreting/generating the first MAC CE to include the first bit map having the first size responsive to the first group of component carriers configured for the communication link, and communicating the second MAC CE may include interpreting/generating the second MAC CE to include the second bit map having the second size responsive to the second group of component carriers configured for the communication link.

Configuring the first group of component carriers at block 1701 may include configuring a primary component carrier and a first group of secondary component carriers, configuring the second group of component carriers at block 1701 may include configuring a primary component carrier and a second group of secondary component carriers, the first and second groups of secondary component carriers may be different, each of the first group of secondary component carriers may correspond to a respective bit of the first bit map, and each of the second group of secondary component carriers may correspond to a respective bit of the second bit map.

A respective component carrier index may be associated with each secondary component carrier of the first group, a respective component carrier index may be associated with each secondary component carrier of the second group, at least one of the component carrier indices of the secondary component carriers of the first group may exceed a threshold, none of the component carrier indices of the secondary component carriers of the second group may exceed the threshold, and the size of the first bit map may be greater than the size of the second bit map.

The first bit map may be arranged in a first number of octets of bits, the second bit map may be arranged in a second number of octets of bits, and the first and second numbers of octets of bits may be different.

A number of component carriers in the first group of component carriers may be greater than a number of component carriers in the second group of component carriers, and the size of the first bit map may be greater than the size of the second bit map.

A number of component carriers in the first group of component carriers may be less than a number of component carriers in the second group of component carriers, and the size of the first bit map may be less than the size of the second bit map.

A respective component carrier index may be associated with each component carrier of the first group, a respective component carrier index may be associated with each component carrier of the second group, at least one of the component carrier indices of the first group may exceed a threshold, none of the component carrier indices of the second group may exceed the threshold, and the size of the first bit map may be greater than the size of the second bit map.

According to some embodiments of inventive concepts, operations discussed above with respect to FIG. 17 may be performed separately and/or in parallel for a plurality of wireless terminals UEs (e.g., wireless terminals UE1 and UE2) in communication with base station BS (e.g., base station BS-1). Bit map sizes of MAC CEs for different wireless terminals UEs may thus have different sizes.

Accordingly, base station BS-1 processor 203 may configure a first group of component carriers for a first communication link between base station BS-1 and a first wireless terminal UE1 at block 1703, and while configured with the first group of component carriers for the first communication link, processor 203 may communicate a first Medium Access Control (MAC) Control Element (CE) over the first communication link at block 1705, with the first MAC CE including a first bit map having a first size with bits of the first bit map corresponding to respective component carriers of the first group of component carriers. In addition, base station BS-1 processor 203 may configure a second group of component carriers for a second communication link between base station BS-1 and a second wireless terminal UE2 at block 1703, and while configured with the second group of component carriers for the second communication link, processor 203 may communicate a second MAC CE over the second communication link at block 1705, with the second MAC CE including a second bit map having a second size with bits of the second bit map corresponding to respective component carriers of the second group of component carriers, and with the first size of the first bit map being different than the second size of the second bit map.

According to some embodiments, base station operations of FIG. 17 may correspond to wireless terminal operations of FIGS. 15A, 15B, and 15C, and definitions of MAC CEs discussed above with respect to FIGS. 15A, 15B, and 15C may apply to MAC CEs of FIG. 17.

According to some embodiments of inventive concepts illustrated in the flowchart of FIG. 18, one or more MAC CEs of a same type (e.g., one or more PHR MAC CEs, or one or more Activation/Deactivation MAC CEs) and having a same bit map size (e.g., one octet) may be used for a same group of component carriers to accommodate different CC configurations, and the one or more MAC CEs for a same group of CCs may be included in a same MAC PDU. For a power headroom report PHR (received by base station BS from wireless terminal UE), for example, if indices of the group of configured CCs can be accommodated in a one octet bit map, one PHR MAC CE of FIG. 3 may be included in the MAC PDU for the power headroom report. If indices of the group of configured CCs cannot be accommodated in a one octet bit map, two or more PHR MAC CEs of FIG. 3 may be included in the MAC PDU for the power headroom report. For an Activation/Deactivation instruction (transmitted from base station BS to wireless terminal UE), for example, if indices of the group of configured CCs can be accommodated in a one octet bit map, one Activation/Deactivation MAC CE of FIG. 6 may be included in the MAC PDU for the Activation/Deactivation instruction. If indices of the group of configured CCs cannot be accommodated in a one octet bit map, two or more Activation/Deactivation MAC CEs of FIG. 6 may be included in the MAC PDU for the Activation/Deactivation instruction.

As shown in FIG. 18, responsive to determining that a CC configuration should change at block 1801, base station BS processor 203 may configure a first group of component carriers for a communication link between wireless terminal UE and base station BS at block 1803. While configured with the first group of component carriers, processor 203 may communicate first and second Medium Access Control (MAC) Control Elements (CEs) (through transceiver 201) with the first MAC CE including a first bit map at block 1805, with bits of the first bit map corresponding to respective component carriers of a first sub-set of the first group of component carriers, and with the second MAC CE including a second bit map with bits of the second bit map corresponding to respective component carriers of a second sub-set of the first group of component carriers. As long as the CC configuration remains unchanged at block 1801, operations of blocks 1801 and 1805 may be repeated using first and second MAC CEs for different sub-sets of the first group of component carriers that are configured for the communication link.

Responsive to changing the CC configuration at block 1801, processor 203 may configure a second group of component carriers for a communication link between wireless terminal UE and base station BS, with the second group of component carriers being different than the first group of component carriers. While configured with the second group of component carriers, processor 203 may communicate a third MAC CE (through transceiver 201) at block 1805, with the third MAC CE including a third bit map with bits of the third bit map corresponding to respective component carriers of the second group of component carriers. As long as the CC configuration remains unchanged at block 1801, operations of blocks 1801 and 1805 may be repeated using only one MAC CE for the second group of component carriers.

Moreover, the first, second, and third bit maps may have a same size, with the second group of component carriers including a primary component carrier and a plurality of secondary component carriers, and with each of the plurality of secondary component carriers corresponding to one of the bits of the third bit map.

In addition, the first and second MAC CE's may be included in a same MAC Protocol Data Unit (PDU). For example, the first and second MAC CE's may be included in a first MAC Protocol Data Unit (PDU), and the third MAC CE may be included in a second MAC PDU. According to some embodiments, base station operations of FIG. 18 may correspond to wireless terminal operations of FIG. 16, and definitions of MAC CEs discussed above with respect to FIG. 16 may apply to MAC CEs of FIG. 18.

In some of the embodiments described above, the transmitter of a MAC CE may select one of several MAC CE versions based on the number/group of carriers that is configured for the wireless terminal, or in one particular embodiment, based on whether or not the wireless terminal is configured to use a cell which has a cell index above a threshold (e.g., a cell index greater than 7).

A wireless terminal UE may be configured with a serving cell(s) via the RRC-layer, and the base station eNB may send an RRC message (RRCConnectionReconfiguration) to the wireless terminal UE indicating to add the serving cell/cells which has/have been indicated in the RRC message. For RRC messages, the wireless terminal UE may be allowed a certain processing time during which the wireless terminal UE executes procedures/operations used to apply the configuration. In the example of adding (or configuring) a serving cell, the wireless terminal UE may be allowed a processing time of 20 ms. Accordingly, if the wireless terminal UE receives an RRC message indicating to add a component carrier (also referred to as a serving cell) at time T, the wireless terminal UE should complete the addition (or configuration) of the serving cell, at the latest, by the time T+20 ms, but the wireless terminal UE may complete the configuration earlier. When the wireless terminal UE has successfully applied the configuration requested by the RRC message, the wireless terminal UE will respond to the network with a completion message (RRCConnectionReconfigurationComplete) indicating that the configuration has been completed. This message indicates to the network that the UE now is applying the new configuration (the configuration which was indicated by the RRC message).

To be able to send the completion message (RRCConnectionReconfigurationComplete), the wireless terminal UE must be scheduled on PUSCH (Physical Uplink Shared Channel) by the network (as with any other transmission on PUSCH), and transmissions on PUSCH use a synchronous HARQ (Hybrid Automatic Repeat Request) protocol.

The HARQ protocol is a stop-and-wait type of transmission protocol in which the transmitter (in this case the wireless terminal UE) sends data and awaits feedback from the receiver on whether the receiver (in this case the network base station eNB) successfully received the transmission or whether the transmitter should perform a retransmission. In LTE (Long Term Evolution), the time between the transmissions and the expected feedback is 4 milliseconds (ms), and the subsequent retransmission (if any) is performed 4 milliseconds later. This means that the transmitter is transmitting every 8 milliseconds. In LTE, however, the wireless terminal UE may have 8 parallel HARQ processes, which means that in each subframe, the wireless terminal UE can perform a transmission using a different HARQ process in each subframe.

Due to the HARQ protocol and the provision of parallel HARQ processes, data packets from the transmitter may arrive at the receiver out of order. If the wireless terminal UE should send two sets of data S1 and S2 (e.g., data packets S1 and S2), the first set of data S1 may be sent using the first HARQ process in subframe n, and the second (subsequent) set of data S2 may be sent using a second HARQ process which is transmitted in subframe n+1. If the transmission of data S1 in subframe n fails but the transmission of data S2 in the subframe n+1 succeeds, the receiver would first receive the second set of data S2 before receiving the first set of data S1.

Going back to the RRC complete message, the RRC complete message may be sent in subframe n, and a MAC CE may be transmitted in subframe n+1. As explained above, however, the MAC CE may be successfully received by the base station eNB before the RRC completion message is received by base station (e.g., if the initial reception of the RRC completion message fails at the eNB base station). In this situation, when the base station eNB receives the MAC CE in subframe n+1, the base station eNB will yet not know that the base station UE has applied the new RRC configuration because the base station eNB has not received the RRC completion message yet.

In summary, the base station eNB may add (or remove) a set of serving cells for the wireless terminal UE, but due to the HARQ protocol, the base station eNB may not know whether the wireless terminal UE has successfully performed the configuration or not. In this situation, the base station eNB will therefore not know which MAC CE version the wireless terminal UE is sending, and the base station eNB would therefore not know how to decode the MAC CEs received from the wireless terminal UE, and as a result, the base station may be unable to decode all data units included in the same transmission as the MAC CE so that the undecoded data units may need to be discarded.

When applying some embodiments of MAC CEs discussed above, the network base station eNB may not know which version of the MAC CE the wireless terminal UE is applying during the time when the UE is applying an RRC reconfiguration message (e.g., between the time the base station eNB transmits an RRCConnectionReconfiguration message and the time the base station eNB receives an RRCConnectionReconfigurationComplete message).

According to some embodiments discussed below, methods/operations may be provided to address/resolve this issue, for example, by having the wireless terminal UE send an indicator (also referred to as a MAC CE version indicator) to the network base station eNB which can be used by the network base station eNB to determine which MAC CE version the wireless terminal UE is sending. This indicator will be referred to as version indicator may be included in a version indicator field of the MAC CE. By providing the version indicator in a version indicator field of a MAC CE, the receiving base station eNB can determine which MAC CE version is being sent to correctly decode the MAC CE.

According to some other embodiments, the wireless terminal UE may suspend transmissions of MAC CEs responsive to receiving an RRCConnectionReconfiguration message until a HARQ acknowledgment ACK of the RRCConnectionReconfigurationComplete message is received from the base station eNB.

It should be appreciated that, even though it has been used as example that a wireless terminal UE indicates the MAC CE version to the network base station eNB, embodiments could also be used to allow the network base station eNB to indicate to the wireless terminal UE which MAC CE version it sent. In addition, it should be appreciated that even though embodiments are disclosed using different versions of MAC CEs, embodiments may also be applied to indicate different versions of other messages such as MAC headers, MAC sub headers, and/or payload, which may also cause version uncertainty.

According to some embodiments, a mapping may be established between values of the version indicator field and the MAC CE versions. The wireless terminal UE may indicate in the MAC CE version indicator field the version of the MAC CE by setting the version indicator field: to a first value to indicate that the MAC CE is of a first version; to a second value to indicate that the MAC CE is of a second version; a third value to indicate that the MAC CE is of a third version; etc. In particular, when the version indicator field is a one-bit flag, the wireless terminal UE may set the flag to 0 (or 1) when a first version of the MAC CE is used, and the wireless terminal UE may set the flag to 1 (or 0) when a second version of the MAC CE is used.

This version indicator field may be implemented by using a reserved bit in an existing MAC CE. In the Extended Power Headroom MAC CE illustrated in FIGS. 21A and 21B, the R-field in the top right position of the figure may be set to 0 if the first version of the MAC CE is sent (supporting 1 primary component carrier and 7 secondary component carriers $C_1$ to $C_7$) as shown in FIG. 21A, while setting the R-field to 1 if the other version of MAC CE is sent (supporting 1 primary component carrier and 31 secondary component carriers) as shown in FIG. 21B. In the example of FIGS. 21A-B, the version indicator field may be included in the first octet used to provide the component carrier bit map of the MAC CE. According to the embodiment of FIGS. 3-4, the embodiment of FIGS. 6-7, the embodiment of FIG. 8, and the embodiment of FIG. 10, the version indicator field may be included in the last octet used to provide the component carrier bit map of the MAC CE (using the bit labeled R).

Based on the MAC CE version indicator included in the version indicator field, the base station eNB can know when receiving the MAC CE whether the wireless terminal UE has sent the first MAC CE version or the second MAC CE version based on whether the version indicator bit is 0 or 1. If this embodiment is used, the name of the version indicator field may be changed from the name 'R' (which indicates that the field is 'Reserved') to another name, e.g., I (to indicate Indicator).

According to other embodiments, the wireless terminal UE may indicate in the MAC CE which version is used by changing (e.g., toggling) a flag to a different value (after a reconfiguration resulting in change of MAC CE versions) than the value which the flag had in a previous transmission (before a reconfiguration resulting in change of MAC CE versions). For example, if two MAC CE versions are used, a one-bit flag can be used which is toggled when changing the version of the MAC CE. As an alternative to toggling a one bit flag, a multi-bit version indicator field which can take more than two values can be used, and the value of the version indictor may be increased/incremented (or decreased/decremented or altered according to some other rule or sequence) when the MAC CE version changes. A version indicator field which can distinguish more than two values or states may provide version consistency in the event that a version is reconfigured again before a previous version change has been confirmed. Stated in other words, a multi-bit version indicator field may enable overlapping reconfigurations. Also, a multi-bit version indicator field which can take more than two values may be particularly useful if there are more than two (MAC CE) versions to distinguish between.

The base station eNB can thus know that if the value of the version indicator field has changed compared to the previous value of the version indicator field (i.e., compared to the last time the MAC CE was sent), the wireless terminal UE is sending a different version of the MAC CE.

Figure 19A:
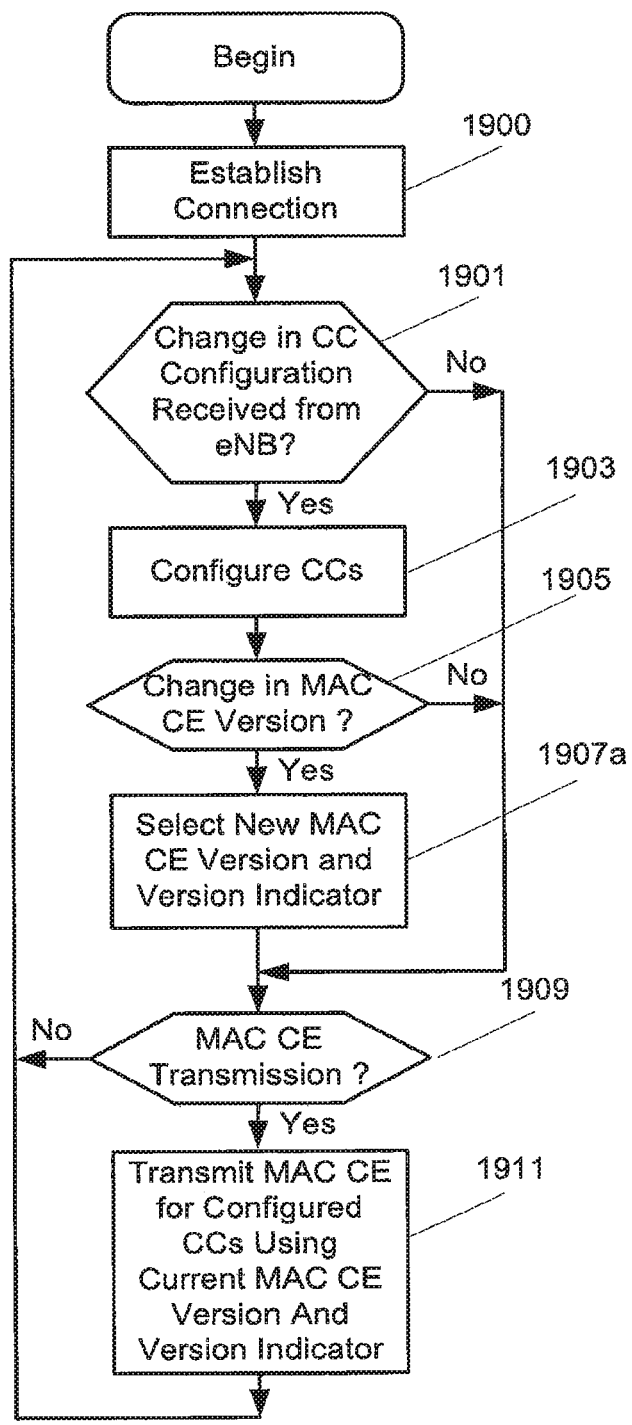
FIGS. 19A, 19B, and 19C are flow charts illustrating operations of wireless terminals (UEs) according to some embodiments of inventive concepts.

FIG. 19A is a flow chart illustrating wireless terminal UE operations according to some embodiments of inventive concepts. At block 1900, UE processor 303 may establish a connection (e.g., an RRC connection) with base station BS through transceiver 301. In establishing the connection, an initial configuration of component carriers (CCs) may be defined for the connection, and this initial configuration may be considered a change in CC configuration at block 1901 (relative to no configured component carriers before establishing connection). At block 1903, processor 303 may configured the component carriers, and as a part of block 1903, processor 303 may transmit a completion message (through transceiver 301) to base station BS indicating completion of the CC configuration. Because the wireless terminal was not previously connected to base station BS, the first MAC CE version for the first CC configuration of the connection will be a change (from no previously defined MAC CE version) at block 1905, and processor 303 may thus select the appropriate MAC CE version and version indicator at block 1907a. At blocks 1909, 1911, and 1901 for each transmission of a MAC CE, processor 303 may thus transmit MAC CEs (through transceiver 301 using the initial MAC CE version and MAC CE version indicator, until a change in CC configuration is received from base station BS (e.g., using an RRCConnectionReconfiguration message) at block 1901.

Upon receipt (through transceiver 301) of a message (e.g., an RRCConnectionReconfiguration message) changing the CC configuration at block 1901, processor 301 may configure the new component carriers at block 1903. As discussed above configuring the component carriers at block 1903 may include transmitting a completion message (e.g., an RRC-ConnectionReconfigurationComplete message) through transceiver 301 to base station BS. Such a change in CC configuration may or may not require use of a new MAC CE version and a new version indicator.

For example, if an initial CC configuration includes component carriers $C_1$, $C_3$, and $C_5$ and a next CC configuration includes component carriers $C_2$, $C_4$, and $C_6$, both CC configurations may be accommodated using the MAC CE version of FIG. 21A with a 7-bit bit map for component carriers, and no change in MAC CE version is needed at block 1905. In such a case, processor 303 may proceed with operations of blocks 1909, 1911, and 1901 without selecting a new MAC CE version and version indicator until a next change in CC configuration at block 1901.

On the other hand, if an initial CC configuration includes component carriers $C_1$, $C_3$, and $C_5$ and a next CC configuration includes component carriers $C_2$, $C_6$, and $C_{14}$, the initial CC configuration may be supported using the MAC CE version of FIG. 21A (with a 7-bit bit map for component carriers), but the second CC configuration may require the MAC CE version of FIG. 21B (with a 31-bit bit map for component carriers). Accordingly, a change in MAC CE version may be indicated at block 1905. In response to determining that a change in MAC CE version is indicated at block 1905, processor 303 may select a new MAC CE version and version indicator at block 1907a, and the new MAC CE version and version indicator may be used for subsequent MAC CE transmissions at block 1911 until a new CC configuration is received at block 1901.

Processor 303 may thus cycle through operations of blocks 1901, 1909, and 1911 transmitting MAC CE using a same MAC CE version and version indicator until a change in CC configuration is received at block 1901 that dictates a change in MAC CE version at block 1905.

In embodiments, of FIG. 19A, each version indicator may map to a respective MAC CE version. For example, a 1 bit version indicator may have two values (0 and 1) that respectively map to the two MAC CE versions of FIGS. 21A and 21B, or a 2 bit version indicator may have four values (00, 01, 10, and 11) that respectively map to four MAC CE versions. In such embodiments, the version indicator may effectively identify the MAC CE being used.

Figure 19B:
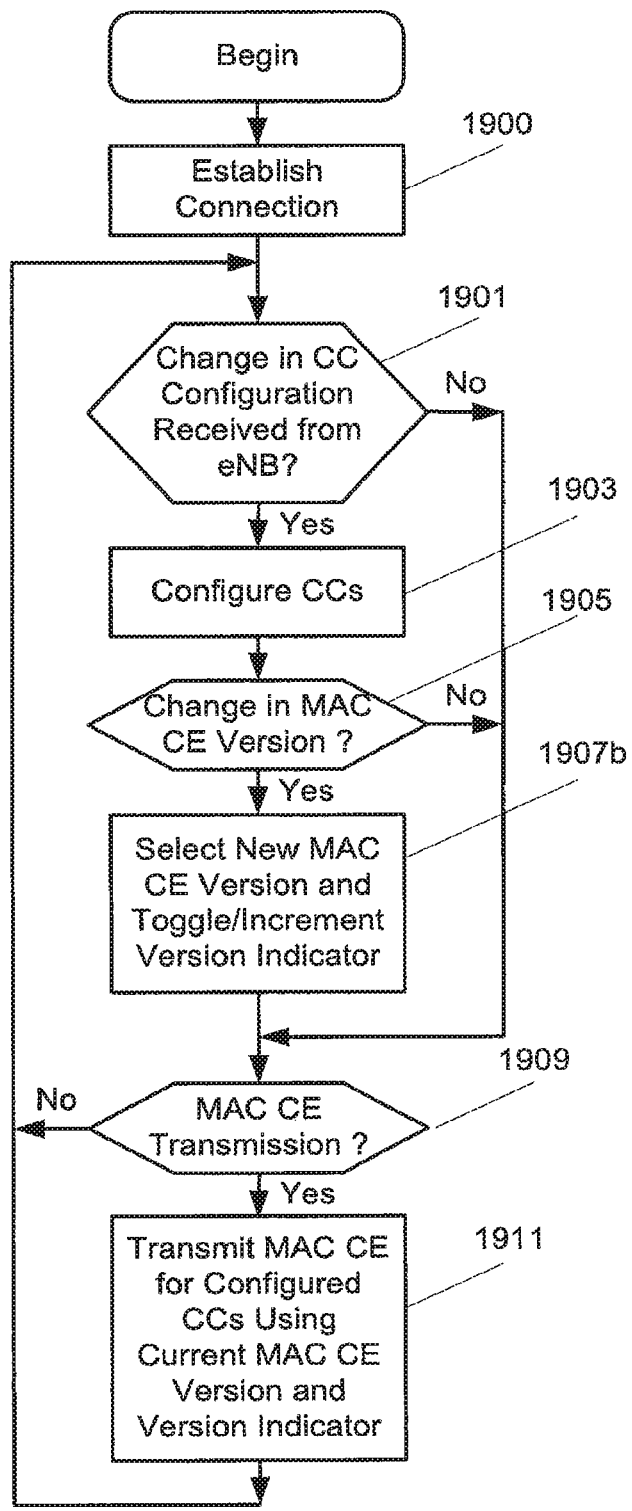

According to some other embodiments of FIG. 19B, the version indicator may be used to indicate a change in MAC CE version without necessarily identifying the particular MAC CE being used. Operations of blocks 1900, 1901, 1903, 1905, 1909, and 1911 may be substantially the same as discussed above with respect to FIG. 19A. In block 1907b, however, the version indicator may be toggled or incremented/decremented to indicate a change in the MAC CE version. With a one bit version indicator, the value of the version indicator may be toggled (changed from 1 to 0 or from 0 to 1) when the MAC CE version changes. A one bit version indicator may thus be used to indicate a change of MAC CE version regardless of the number of MAC CE versions that may be available. Similarly, a 2 bit version indicator (with 4 possible values) may be incremented/decremented each time the MAC CE version changes. By incrementing, a value of the version indicator may be increased by one (e.g., from 00 to 01, from 01 to 10, from 10 to 11, or from 11 to 00), and by decrementing, a value of the version indicator may be decreased by one (e.g., from 00 to 11, from 11 to 10, from 10 to 01, or from 01 to 00).

In LTE, the wireless terminal UE may be expected to have complied with an RRC message after a certain time which may be in the range of 10-20 milliseconds (depending on which type of reconfiguration is done). The base station eNB may need to only monitor the version indicator field for a certain time (e.g., the 10-20 millisecond delay time, also referred to as a monitor period) after transmitting an RRC message that is expected to make the wireless terminal UE change the MAC CE version. After the monitoring period has passed, the base station BS may assume that the wireless terminal UE is using the new MAC CE version. Therefore this embodiment allows the base station eNB to refrain from monitoring the version indicator field after the monitoring period has passed, and some processing gain can be achieved because the base station eNB does not need to apply the additional logic used to determine the value of the version indicator field after this monitoring period has passed.

The base station eNB may also only needs to monitor the version indicator field until the wireless terminal UE has confirmed that the RRC configuration has been applied (e.g., when the base station eNB receives the RRCConnectionReconfigurationComplete message). The eNB may thus only needs to monitor the version indicator field for the shorter of the two durations (completion of the monitoring period or receipt of the RRCConnectionReconfigurationComplete message).

Figure 20:
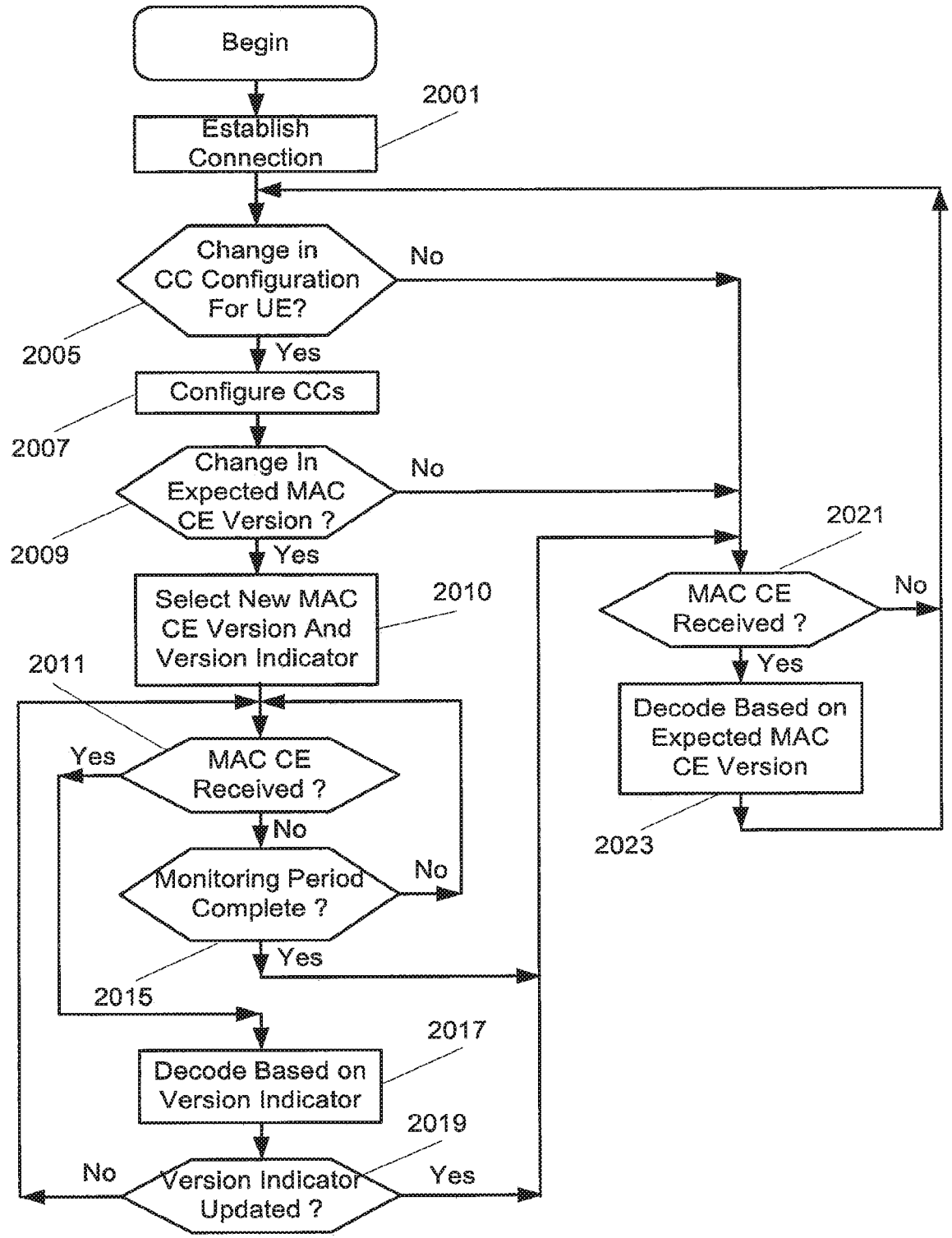
FIG. 20 is a flow chart illustrating operations of a base station (eNB) according to some embodiments of inventive concepts.

FIG. 20 is a flow chart illustrating base station operations according to some embodiments discussed above. At block 2001, processor 203 may establish a connection through transceiver 201 with wireless terminal UE, and establishing the connection may include configuring the wireless terminal UE with one component carrier (e.g., the primary component carrier PCell). Until there is a change in CC configuration at block 2005, processor 203 may cycle through operations of blocks 2005, 2021, and 2023, and processor 203 may receive/decode MAC CEs from wireless terminal UE at block 2023 based on the expected MAC CE version (e.g., without considering the version indicator).

If processor 203 determines that the CC configuration for wireless terminal UE should be changed at block 2005, processor 203 may provide the new CC configuration at block 2007 by transmitting an RRCConnectionReconfiguration message indicating the new CC configuration. If the new CC configuration is not expected to result in a change in the MAC CE version at block 2009, processor 203 may continue with operations of blocks 2021, 2023, and 2005, and processor 203 may receive/decode MAC CEs from wireless terminal UE at block 2023 based on the expected MAC CE version (e.g., without considering the version indicator). If a previous CC configuration configures component carriers $C_1$, $C_3$, and $C_5$ and the new CC configuration of block 2007 configures component carriers $C_2$, $C_4$, and $C_6$, the MAC CE version of FIG. 21A may be used both before and after changing the CC configuration.

If the new CC configuration is expected to result in a change in the MAC CE version at block 2009, however, processor 203 may select the new MAC CE version and the new version indicator at block 2010. If a previous CC configuration configures component carriers $C_1$, $C_3$, and $C_5$ and the new CC configuration of block 2007 configures component carriers $C_2$, $C_4$, and $C_{14}$, for example, the MAC CE version of FIG. 21A may be used before changing the CC configuration, and the MAC CE version of FIG. 21B may be used after changing the CC configuration. As discussed above with respect to FIGS. 19A and 19B, the version indicator may be changed from a first value to a second value to allow processor 201 to determine whether a subsequently received MAC CE is of the first or second version. For example, the version indicator may be: changed from a first value that maps to the first MAC CE version to a second value that maps to the second MAC CE version; toggled from a first value to a second value; incremented from a first value to a next value; etc.

At blocks 2011 and 2015, processor 203 may determine if any MAC CEs are received during a monitoring period after transmitting the RRCConnectionReconfiguration message at block 2007 (e.g., up to 20 ms after transmission). If any MAC CEs are received from wireless terminal UE at block 2011 during this monitoring period, processor 203 may receive/decode the MAC CE using/considering the version indicator. For example, processor 203 may receive/decode the MAC CE twice at block 2017, once assuming the previous MAC CE version and once assuming the expected MAC CE version indicator, and the result that decodes properly may be used. If the received MAC CE has the previous version indicator at block 2019, processor 203 may continue with operations of blocks 2011, 2015, 2017, and 2019 of the monitoring period until either the monitoring period is complete at block 2015 or a MAC CE with the new version indicator is received at block 2019. Once the monitoring period is complete at block 2015 or a MAC CE with the new version indicator is received at block 2019, processor 203 may continue with operations of blocks 2021, 2023 (receiving/decoding based on the new current MAC CE version without considering the version indicator), and 2005 until there is a next change in CC configuration at block 2005.

According to some other embodiments, the wireless terminal UE may suspend transmission of an affected type of MAC CE when receiving/decoding/applying an RRC message that would require the wireless terminal UE to change a MAC CE version that is used. Stated in other words, processor 203 may delay transmission of any MAC CEs of the affected type during a delay period even if other processes in the wireless terminal UE suggests that the wireless terminal UE should send such MAC CEs. According to some embodiments, processor 203 may resume transmission of the suspended MAC CE type, for example:

- after a certain time delay has passed (e.g., the RRC processing time has passed since the UE received the RRC message);
- after a certain number of new radio frames have passed; and/or
- on occurrence of a certain event (e.g., reception of an acknowledgement from the base station eNB indicating that the base station eNB has received the RRC complete message (RRCConnectionReconfigurationComplete).

Figure 19C:
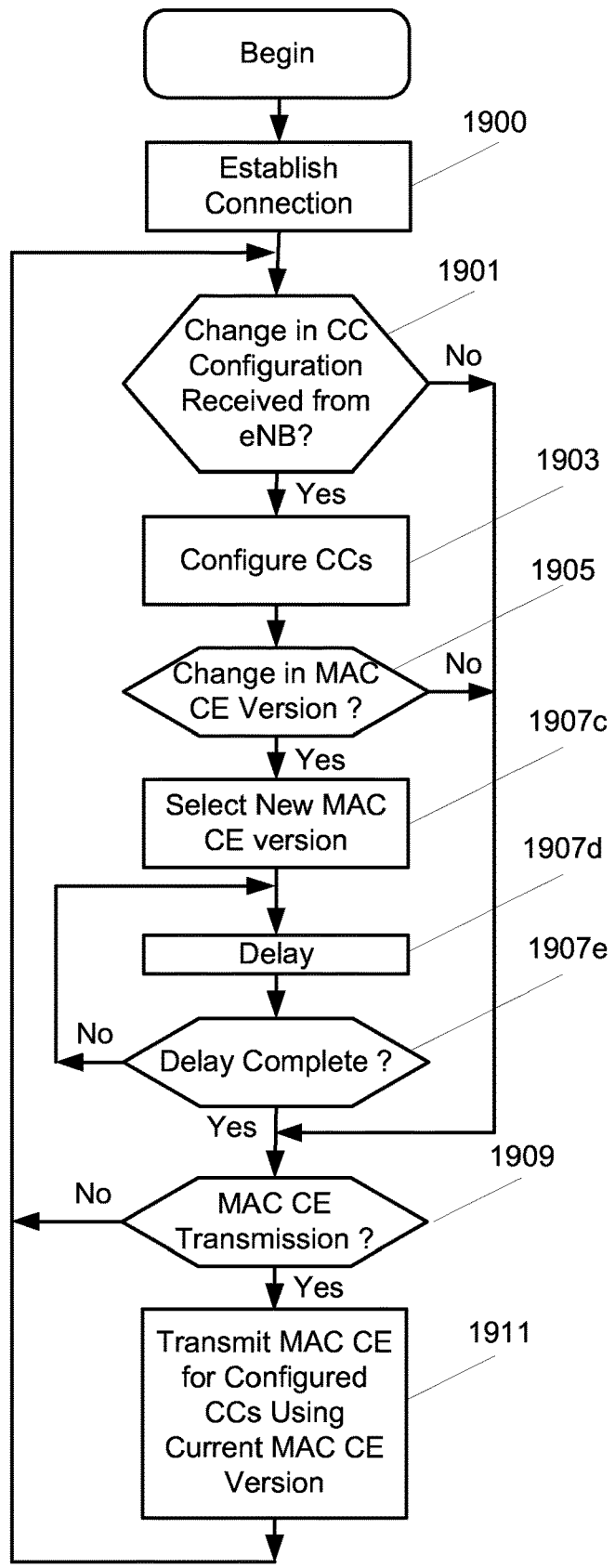

FIG. 19C is a flow chart illustrating wireless terminal operations according to some embodiments discussed above with respect to delay. Operations of blocks 1901, 1903, 1905, and 1909 may be the same discussed above with respect to FIGS. 19A and 19B, and at block 1907c, processor 203 may select the appropriate MAC CE version for the new CC configuration (without selecting a version indicator). At blocks 1907d and 1907e, however, processor 303 may delay any MAC CE transmissions of the affected MAC CE type that may otherwise occur during a period when the base station may be unsure of what MAC CE version to expect. The delay of blocks 1907d and 1907e may be defined to end: after a set period of time (e.g., 20 ms) after receiving the instruction to change the CC configuration at block 1901; after a set number of radio frames (e.g., 3 radio frames) after receiving the instruction to change the CC configuration at block 1901; and/or responsive to receiving an acknowledgement ACK from the base station BS confirming receipt of the completion message (RRCConnectionReconfigurationComplete) that was sent, for example, when configuring the component carriers at block 1903. Because a likelihood of ambiguity regarding the MAC CE version may be reduced at the base station, the version indicator may be omitted from embodiments of FIG. 19C (e.g., at block 1911).

EXAMPLE EMBODIMENTS

Embodiment 1. A method of operating a wireless terminal in communication with a wireless communication network, the method comprising: configuring a first group of component carriers for a communication link between the wireless terminal and the communication network; while configured with the first group of component carriers, communicating a first Medium Access Control, MAC, Control Element, CE, wherein the first MAC CE includes a first bit map having a first bit map size with bits of the first bit map corresponding to respective component carriers of the first group of component carriers; configuring a second group of component carriers for the communication link between the wireless terminal and the communication network wherein the first group of component carriers is different than the second group of component carriers; and while configured with the second group of component carriers, communicating a second MAC CE, wherein the second MAC CE includes a second bit map having a second bit map size with bits of the second bit map corresponding to respective component carriers of the second group of component carriers, and wherein the first bit map size of the first bit map is different than the second bit map size of the second bit map.

Embodiment 2. The method of Embodiment 1 wherein communicating the first MAC CE comprises transmitting a first Extended Power Head Room, PHR, MAC CE, and wherein communicating the second MAC CE comprises transmitting a second Extended PHR MAC CE.

Embodiment 3. The method of Embodiment 2 wherein the first Extended PHR MAC CE includes power head room information for each component carrier of the first group of component carriers.

Embodiment 4. The method of Embodiment 1 wherein communicating the first MAC CE comprises receiving a first Activation/Deactivation MAC CE, and wherein communicating the second MAC CE comprises receiving a second Activation/Deactivation MAC CE.

Embodiment 5. The method of Embodiment 4 further comprising: responsive to the first Activation/Deactivation MAC CE, activating/deactivating each component carrier of the first group of component carriers responsive to the first bit map; and responsive to the second Activation/Deactivation MAC CE, activating/deactivating each component carrier of the second group of component carriers responsive to the second bit map.

Embodiment 6. The method of Embodiment 1 wherein the first MAC CE is an Extended Power Head Room, PHR, MAC CE and the second MAC CE is an Activation/Deactivation MAC CE, or wherein the first MAC CE is an Activation/Deactivation MAC CE and the second MAC CE is an Extended PHR MAC CE.

Embodiment 7. The method of any of Embodiments 1-6 wherein a first Logical Channel Identity, LCID, is provided for the first MAC CE, a second LCID is provided for the second MAC CE, and the first and second LCIDs are different.

Embodiment 8. The method of Embodiment 7 wherein communicating the first MAC CE comprises receiving the first MAC CE and applying bits of the first bit map to respective component carriers of the first group of component carriers responsive to the first LCID, and wherein communicating the second MAC CE comprises receiving the second MAC CE and applying bits of the second bit map to respective component carriers of the second group of component carriers responsive to the second LCID.

Embodiment 9. The method of any of Embodiments 1-5 wherein a first Logical Channel Identity, LCID, is provided for the first MAC CE, a second LCID is provided for the second MAC CE, and the first and second LCIDs are the same.

Embodiment 10. The method of any of Embodiments 1-5 and 9 wherein the first MAC CE includes a first MAC CE version indicator, wherein the second MAC CE includes a second MAC CE version indicator, and wherein the first and second MAC CE version indicators are different.

Embodiment 11. The method of Embodiment 10 wherein configuring the first group of component carriers comprises configuring the first group of component carriers responsive to receiving a first reconfiguration message from the wireless communication network, and wherein configuring the second group of component carriers comprises configuring the second group of component carriers responsive to receiving a second reconfiguration message from the wireless communication network.

Embodiment 12. The method of Embodiment 11 further comprising: responsive to receiving the first reconfiguration message, selecting a first MAC CE version having the first bit map size, wherein communicating the first MAC CE comprises transmitting the first MAC CE to the wireless communication network responsive to selecting the first MAC CE version, wherein the first MAC CE has the first MAC CE version with the first bit map size and the first version indicator; and responsive to receiving the second reconfiguration message, selecting a second MAC CE version having the second bit map size, wherein communicating the second MAC CE comprises transmitting the second MAC CE responsive to selecting the second MAC CE version, wherein the second MAC CE has the second MAC CE version with the second bit map size and the second version indicator.

Embodiment 13. The method of any of Embodiments 1-5 and 9-12 wherein configuring the first group of component carriers comprises configuring the first group of component carriers responsive to receiving a first reconfiguration message from the wireless communication network, and wherein configuring the second group of component carriers comprises configuring the second group of component carriers responsive to receiving a second reconfiguration message from the from the wireless communication network, the method further comprising: responsive to configuring the second group of component carriers, delaying sending any subsequent MAC CEs including the second MAC CE until a delay period has passed and/or until a number of radio frames has passed.

Embodiment 14. The method of any of Embodiments 1-5 and 9-12 wherein configuring the first group of component carriers comprises configuring the first group of component carriers responsive to receiving a first reconfiguration message from the wireless communication network, and wherein configuring the second group of component carriers comprises configuring the second group of component carriers responsive to receiving a second reconfiguration message from the from the wireless communication network, the method further comprising: responsive to receiving the second reconfiguration message, transmitting a reconfiguration complete message to the wireless communication network; and responsive to configuring the second group of component carriers, delaying sending any subsequent MAC CEs including the second MAC CE until an acknowledgement of the reconfiguration complete message is received from the wireless communication network.

Embodiment 15. The method of any of Embodiments 1-5 and 9-14 wherein communicating the first MAC CE comprises transmitting a first Power Headroom Report (PHR) MAC CE including the first bit map having the first bit map size to the wireless communication network, and wherein communicating the second MAC CE comprises transmitting a second PHR MAC CE including the second bit map having the second bit map size to the wireless communication network.

Embodiment 16. The method of any of Embodiments 1-6 and 9 wherein communicating the first MAC CE comprises interpreting/generating the first MAC CE to include the first bit map having the first bit map size responsive to the first group of component carriers configured for the communication link, and wherein communicating the second MAC CE comprises interpreting/generating the second MAC CE to include the second bit map having the second bit map size responsive to the second group of component carriers configured for the communication link.

Embodiment 17. The method of any of Embodiments 1-16 wherein the first group of component carriers includes no more than 8 component carriers, wherein the second group of component carriers includes more than 8 component carriers, and wherein the second bit map size is greater than the first bit map size.

Embodiment 18. The method of Embodiment 17 wherein the first bit map size is no more than one octet and the second bit map size is more than one octet.

Embodiment 19. The method of any of Embodiments 1-18 wherein configuring the first group of component carriers includes configuring a primary component carrier and a first group of secondary component carriers, wherein configuring the second group of component carriers includes configuring a primary component carrier and a second group of secondary component carriers, wherein the first and second groups of secondary component carriers are different, wherein each of the first group of secondary component carriers corresponds to a respective bit of the first bit map, and wherein each of the second group of secondary component carriers corresponds to a respective bit of the second bit map.

Embodiment 20. The method of any of Embodiments 19 wherein a respective component carrier index is associated with each secondary component carrier of the first group, wherein a respective component carrier index is associated with each secondary component carrier of the second group, wherein at least one of the component carrier indices of the secondary component carriers of the first group exceeds a threshold, wherein none of the component carrier indices of the secondary component carriers of the second group exceeds the threshold, and wherein the first bit map size of the first bit map is greater than the second bit map size of the second bit map.

Embodiment 21. The method of any of Embodiments 1-18 wherein configuring the first group of component carriers includes configuring a primary component carrier and a group of secondary component carriers, wherein each of the group of secondary component carriers corresponds to a respective bit of the first bit map, and wherein configuring the second group of component carriers includes configuring a primary component carrier.

Embodiment 22. The method of Embodiment 21 wherein configuring the second group of component carriers includes configuring a primary component carrier without configuring any secondary component carriers for the second group.

Embodiment 23. The method of any of Embodiments 1-22 wherein the first bit map is arranged in a first number of octets of bits, wherein the second bit map is arranged in a second number of octets of bits, and wherein the first and second numbers of octets of bits are different.

Embodiment 24. The method of any of Embodiments 1-23 wherein a number of component carriers in the first group of component carriers is greater than a number of component carriers in the second group of component carriers and wherein the first bit map size of the first bit map is greater than the second bit map size of the second bit map.

Embodiment 25. The method of any of Embodiments 1-20 and 23 wherein a number of component carriers in the first group of component carriers is less than a number of component carriers in the second group of component carriers and wherein the first bit map size of the first bit map is less than the second bit map size of the second bit map.

Embodiment 26. The method of any of Embodiments 1-25 wherein a respective component carrier index is associated with each component carrier of the first group, wherein a respective component carrier index is associated with each component carrier of the second group, wherein at least one of the component carrier indices of the first group exceeds a threshold, wherein none of the component carrier indices of the second group exceeds the threshold, and wherein the first bit map size of the first bit map is greater than the second bit map size of the second bit map.

Embodiment 27. The method of any of Embodiments 1-26 wherein communicating the first MAC CE comprises communicating the first MAC CE after configuring the first group of component carriers, wherein configuring the second group of component carriers comprises configuring the second group of component carriers after communicating the first MAC CE, and wherein communicating the second MAC CE comprises communicating the second MAC CE after configuring the second group of component carriers.

Embodiment 28. The method of any of Embodiments 1-26 wherein communicating the second MAC CE comprises communicating the second MAC CE after configuring the second group of component carriers, wherein configuring the first group of component carriers comprises configuring the first group of component carriers after communicating the second MAC CE, and wherein communicating the first MAC CE comprises communicating the first MAC CE after configuring the first group of component carriers.

Embodiment 29. A method of operating a wireless terminal in communication with a wireless communication network, the method comprising: configuring a group of component carriers for a communication link between the wireless terminal and the communication network; and while configured with the group of component carriers, communicating first and second Medium Access Control, MAC, Control Elements, CEs, wherein the first MAC CE includes a first bit map with bits of the first bit map corresponding to respective component carriers of a first sub-set of the group of component carriers, and wherein the second MAC CE includes a second bit map with bits of the second bit map corresponding to respective component carriers of a second sub-set of the group of component carriers.

Embodiment 30. The method of Embodiment 29, wherein the group of component carriers is a first group of component carriers, the method further comprising: configuring a second group of component carriers for a communication link between the wireless terminal and the communication network, wherein the second group of component carriers is different than the first group of component carriers; and while configured with the second group of component carriers, communicating a third MAC CE wherein the third MAC CE includes a third bit map with bits of the third bit map corresponding to respective component carriers of the second group of component carriers.

Embodiment 31. The method of Embodiment 30 wherein the first, second, and third bit maps have a same bit map size, wherein the second group of component carriers includes a primary component carrier and a plurality of secondary component carriers, and wherein each of the plurality of secondary component carriers corresponds to one of the bits of the third bit map.

Embodiment 32. The method of any of Embodiments 30-31 wherein configuring the first group of component carriers includes configuring a primary component carrier and a group of secondary component carriers, wherein the first sub-set of the group of component carriers comprises a first sub-set of the group of secondary component carriers, and wherein the second sub-set of the group of component carriers comprises a second sub-set of the group of secondary component carriers.

Embodiment 33. The method of Embodiment 32 wherein configuring the second group of component carriers includes configuring a primary component carrier without configuring any secondary component carriers for the second group.

Embodiment 34. The method of any of Embodiments 29-33 wherein the first and second MAC CE's are included in a same MAC Protocol Data Unit, PDU.

Embodiment 35. The method of any of Embodiments 29-33 wherein the first and second MAC CE's are included in a first MAC Protocol Data Unit, PDU, and wherein the third MAC CE is included in a second MAC PDU.

Embodiment 36. A wireless terminal comprising: a transceiver configured to provide radio communications with a wireless communication network over a radio interface; and a processor coupled with the transceiver, wherein the processor is configured to perform operations of any of Embodiments 1-35.

Embodiment 37. A wireless terminal adapted to perform operations of any of Embodiments 1-35.

Embodiment 38. A method of operating a node of a wireless communication network, the method comprising: configuring a first group of component carriers for a communication link between the node of the communication network and a wireless terminal; while configured with the first group of component carriers for the communication link, communicating a first Medium Access Control, MAC, Control Element, CE, over the communication link, wherein the first MAC CE includes a first bit map having a first bit map size with bits of the first bit map corresponding to respective component carriers of the first group of component carriers; configuring a second group of component carriers for the communication link between the node of the communication network and the wireless terminal; and while configured with the second group of component carriers, communicating a second MAC CE, over the communication link wherein the second MAC CE includes a second bit map having a second bit map size with bits of the second bit map corresponding to respective component carriers of the second group of component carriers, and wherein the first bit map size of the first bit map is different than the second bit map size of the second bit map.

Embodiment 39. The method of Embodiment 38 wherein communicating the first MAC CE comprises receiving a first Extended Power Head Room, PHR, MAC CE, and wherein communicating the second MAC CE comprises receiving a second Extended PHR MAC CE.

Embodiment 40. The method of Embodiment 38 wherein communicating the first MAC CE comprises transmitting a first Activation/Deactivation MAC CE, and wherein communicating the second MAC CE comprises transmitting a second Activation/Deactivation MAC CE.

Embodiment 41. The method of Embodiment 40 further comprising: activating/deactivating each component carrier of the first group of component carriers in accordance with the first bit map; and activating/deactivating each component carrier of the second group of component carriers in accordance with the second bit map.

Embodiment 42. The method of any of Embodiments 38-41 wherein a first Logical Channel Identity, LCID, is provided for the first MAC CE, a second LCID is provided for the second MAC CE, and the first and second LCIDs are different.

Embodiment 43. The method of Embodiment 42 wherein communicating the first MAC CE comprises receiving the first MAC CE and applying bits of the first bit map to respective component carriers of the first group of component carriers responsive to the first LCID, and wherein communicating the second MAC CE comprises receiving the second MAC CE and applying bits of the second bit map to respective component carriers of the second group of component carriers responsive to the second LCID.

Embodiment 44. The method of any of Embodiments 38-43 wherein a first Logical Channel Identity, LCID, is provided for the first MAC CE, a second LCID is provided for the second MAC CE, and the first and second LCIDs are the same.

Embodiment 45. The method of any of Embodiments 38-41 and 44 wherein the first MAC CE includes a first MAC CE version indicator, wherein the second MAC CE includes a second MAC CE version indicator, and wherein the first and second MAC CE version indicators are different.

Embodiment 46. The method of Embodiment 45 wherein configuring the first group of component carriers comprises transmitting a first reconfiguration message to the wireless terminal, and wherein configuring the second group of component carriers comprises transmitting a second reconfiguration message to the wireless terminal.

Embodiment 47. The method of Embodiment 46 further comprising: responsive to transmitting the first reconfiguration message, selecting a first MAC CE version having the first bit map size, wherein communicating the first MAC CE comprises receiving the first MAC CE from the wireless terminal and decoding the first MAC CE assuming the first MAC CE version responsive to selecting the first MAC CE version; and responsive to transmitting the second reconfiguration message, selecting a second MAC CE version having the second bit map size, wherein communicating the second MAC CE comprises receiving the second MAC CE from the wireless terminal and decoding the second MAC CE assuming the second MAC CE version responsive to selecting the second MAC CE version.

Embodiment 48. The method of Embodiment 46 further comprising: responsive to transmitting the first reconfiguration message, selecting a first MAC CE version having the first bit map size, wherein communicating the first MAC CE comprises receiving the first MAC CE from the wireless terminal and decoding the first MAC CE assuming the first MAC CE version responsive to selecting the first MAC CE version; and responsive to transmitting the second reconfiguration message, selecting a second MAC CE version having the second bit map size, wherein communicating the second MAC CE comprises receiving the second MAC CE from the wireless terminal, decoding the second MAC CE assuming the second MAC CE version, and decoding the second MAC CE assuming the first MAC CE version responsive to receiving the second MAC CE before completion of a monitoring period after transmitting the second reconfiguration message.

Embodiment 49. The method of any of Embodiments 38-41 and 44-48 wherein communicating the first MAC CE comprises transmitting a first Power Headroom Report (PHR) MAC CE including the first bit map having the first bit map size to the wireless communication network, and wherein communicating the second MAC CE comprises transmitting a second PHR MAC CE including the second bit map having the second bit map size to the wireless communication network.

Embodiment 50. The method of any of Embodiments 38-41 and 44 wherein communicating the first MAC CE comprises interpreting/generating the first MAC CE to include the first bit map having the first bit map size responsive to the first group of component carriers configured for the communication link, and wherein communicating the second MAC CE comprises interpreting/generating the second MAC CE to include the second bit map having the second bit map size responsive to the second group of component carriers configured for the communication link.

Embodiment 51. The method of any of Embodiments 38-50 wherein the first group of component carriers includes no more than 8 component carriers, wherein the second group of component carriers includes more than 8 component carriers, and wherein the second bit map size is greater than the first bit map size.

Embodiment 52. The method of Embodiment 51 wherein the first bit map size is no more than one octet and the second bit map size is more than one octet.

Embodiment 53. The method of any of Embodiments 38-52 wherein configuring the first group of component carriers includes configuring a primary component carrier and a first group of secondary component carriers, wherein configuring the second group of component carriers includes configuring a primary component carrier and a second group of secondary component carriers, wherein the first and second groups of secondary component carriers are different, wherein each of the first group of secondary component carriers corresponds to a respective bit of the first bit map, and wherein each of the second group of secondary component carriers corresponds to a respective bit of the second bit map.

Embodiment 54. The method of any of Embodiments 38-53 wherein a respective component carrier index is associated with each secondary component carrier of the first group, wherein a respective component carrier index is associated with each secondary component carrier of the second group, wherein at least one of the component carrier indices of the secondary component carriers of the first group exceeds a threshold, wherein none of the component carrier indices of the secondary component carriers of the second group exceeds the threshold, and wherein the first bit map size of the first bit map is greater than the second bit map size of the second bit map.

Embodiment 55. The method of any of Embodiments 38-52 wherein configuring the first group of component carriers includes configuring a primary component carrier and a group of secondary component carriers, wherein each of the group of secondary component carriers corresponds to a respective bit of the first bit map, and wherein configuring the second group of component carriers includes configuring a primary component carrier.

Embodiment 56. The method of Embodiment 55 wherein configuring the second group of component carriers includes configuring a primary component carrier without configuring any secondary component carriers for the second group.

Embodiment 57. The method of any of Embodiments 38-5632-45 wherein the first bit map is arranged in a first number of octets of bits, wherein the second bit map is arranged in a second number of octets of bits, and wherein the first and second numbers of octets of bits are different.

Embodiment 58. The method of any of Embodiments 38-57 wherein a number of component carriers in the first group of component carriers is greater than a number of component carriers in the second group of component carriers and wherein the first bit map size of the first bit map is greater than the second bit map size of the second bit map.

Embodiment 59. The method of any of Embodiments 38-57 wherein a number of component carriers in the first group of component carriers is less than a number of component carriers in the second group of component carriers and wherein the first bit map size of the first bit map is less than the second bit map size of the second bit map.

Embodiment 60. The method of any of Embodiments 38-59 wherein a respective component carrier index is associated with each component carrier of the first group, wherein a respective component carrier index is associated with each component carrier of the second group, wherein at least one of the component carrier indices of the first group exceeds a threshold, wherein none of the component carrier indices of the second group exceeds the threshold, and wherein the first bit map size of the first bit map is greater than the second bit map size of the second bit map.

Embodiment 61. The method of any of Embodiments 38-60 wherein communicating the first MAC CE comprises communicating the first MAC CE after configuring the first group of component carriers, wherein configuring the second group of component carriers comprises configuring the second group of component carriers after communicating the first MAC CE, and wherein communicating the second MAC CE comprises communicating the second MAC CE after configuring the second group of component carriers.

Embodiment 62. The method of any of Embodiments 38-60 wherein communicating the second MAC CE comprises communicating the second MAC CE after configuring the second group of component carriers, wherein configuring the first group of component carriers comprises configuring the first group of component carriers after communicating the second MAC CE, and wherein communicating the first MAC CE comprises communicating the first MAC CE after configuring the first group of component carriers.

Embodiment 63. A method of operating a node of a wireless communication network, the method comprising: configuring a first group of component carriers for a first communication link between the node of the communication network and a first wireless terminal; while configured with the first group of component carriers for the first communication link, communicating a first Medium Access Control, MAC, Control Element, CE, over the first communication link, wherein the first MAC CE includes a first bit map having a first bit map size with bits of the first bit map corresponding to respective component carriers of the first group of component carriers; configuring a second group of component carriers for a second communication link between the node of the communication network and a second wireless terminal; and while configured with the second group of component carriers for the second communication link, communicating a second MAC CE, over the second communication link wherein the second MAC CE includes a second bit map having a second bit map size with bits of the second bit map corresponding to respective component carriers of the second group of component carriers, and wherein the first bit map size of the first bit map is different than the second bit map size of the second bit map.

Embodiment 64. The method of Embodiment 63 wherein configuring the first group of component carriers includes configuring a primary component carrier and a group of secondary component carriers, wherein each of the group of secondary component carriers corresponds to a respective bit of the first bit map, and wherein configuring the second group of component carriers includes configuring a primary component carrier.

Embodiment 65. The method of Embodiment 64 wherein configuring the second group of component carriers includes configuring a primary component carrier without configuring any secondary component carriers for the second group.

Embodiment 66. A method of operating a node of a wireless communication network, the method comprising: configuring a group of component carriers for a communication link between a wireless terminal and the node of the communication network; and while configured with the group of component carriers, communicating first and second Medium Access Control, MAC, Control Elements, CEs, wherein the first MAC CE includes a first bit map with bits of the first bit map corresponding to respective component carriers of a first sub-set of the group of component carriers, and wherein the second MAC CE includes a second bit map with bits of the second bit map corresponding to respective component carriers of a second sub-set of the group of component carriers.

Embodiment 67. The method of Embodiment 66, wherein the group of component carriers is a first group of component carriers, the method further comprising: configuring a second group of component carriers for a communication link between the wireless terminal and the node of the communication network, wherein the second group of component carriers is different than the first group of component carriers; and while configured with the second group of component carriers, communicating a third MAC CE wherein the third MAC CE includes a third bit map with bits of the third bit map corresponding to respective component carriers of the second group of component carriers.

Embodiment 68. The method of Embodiment 67 wherein configuring the first group of component carriers includes configuring a primary component carrier and a group of secondary component carriers, wherein the first sub-set of the group of component carriers comprises a first sub-set of the group of secondary component carriers, and wherein the second sub-set of the group of component carriers comprises a second sub-set of the group of secondary component carriers.

Embodiment 69. The method of Embodiment 68 wherein configuring the second group of component carriers includes configuring a primary component carrier without configuring any secondary component carriers for the second group.

Embodiment 70. The method of Embodiment 67, wherein the first, second, and third bit maps have a same bit map size, wherein the second group of component carriers includes a primary component carrier and a plurality of secondary component carriers, and wherein each of the plurality of secondary component carriers corresponds to one of the bits of the third bit map.

Embodiment 71. The method of any of Embodiments 66-70 wherein the first and second MAC CE's are included in a same MAC Protocol Data Unit, PDU.

Embodiment 72. The method of any of Embodiments 66-70 wherein the first and second MAC CE's are included in a first MAC Protocol Data Unit, PDU, and wherein the third MAC CE is included in a second MAC PDU.

Embodiment 73. A node of a wireless communication network, the node comprising: a communication interface configured to provide communications with one or more wireless terminals over a radio interface; and a processor coupled with the communication interface, wherein the processor is configured to perform operations of any of Embodiments 38-72.

Embodiment 74. A node of a wireless communication network adapted to perform operations of any of Embodiments 38-72.

Embodiment 75. A method of operating a wireless terminal in communication with a wireless communication network, the method comprising: configuring a first group of component carriers for a communication link between the wireless terminal and the communication network; responsive to configuring the first group of component carriers, selecting a first Medium Access Control, MAC, Control Element, CE, version; while configured with the first group of component carriers, communicating a first MAC CE using the first MAC CE version; after communicating the first MAC CE, configuring a second group of component carriers for the communication link between the wireless terminal and the communication network wherein the first group of component carriers is different than the second group of component carriers; responsive to configuring the second group of component carriers, selecting a second MAC CE version different than the first MAC CE version; and while configured with the second group of component carriers, communicating a second MAC CE using the second MAC CE version.

Embodiment 76. The method of Embodiment 75 wherein the first MAC CE version defines a first bit map size of a MAC CE, wherein the first MAC CE includes a first bit map having the first bit map size with bits of the first bit map corresponding to respective component carriers of the first group of component carriers, wherein the second MAC CE version defines a second bit map size of a MAC CE different than the first bit map size, and wherein the second MAC CE includes a second bit map having a second bit map size with bits of the second bit map corresponding to respective component carriers of the second group of component carriers.

Embodiment 77. The method of any of Embodiments 75-76 further comprising: responsive to configuring the first group of component carriers, selecting a first MAC CE version indicator, wherein the first MAC CE includes the first MAC CE version indicator; and responsive to configuring the second group of component carriers, selecting a second MAC CE version indicator different than the first MAC CE version indicator, wherein the second MAC CE includes the second MAC CE version indicator.

Embodiment 78. The method of any of Embodiments 77 wherein the first MAC CE version indicator has a first value that maps to the first MAC CE version, wherein the second MAC CE version indicator has a second value that maps to the second MAC CE version.

Embodiment 79. The method of any of Embodiments 77 wherein selecting the second MAC CE version indicator comprises changing the first MAC CE version indicator to the second MAC CE version indicator responsive to configuring the second group of component carriers.

Embodiment 80. The method of Embodiment 79 wherein changing comprises toggling a MAC CE version indicator bit from a first MAC CE version indicator value to a second MAC CE version indicator value.

Embodiment 81. The method of Embodiment 80 further comprising: after communicating the second MAC CE, configuring a third group of component carriers for the communication link between the wireless terminal and the communication network wherein the third group of component carriers is different than the first group of component carriers and different than the second group of component carriers; responsive to configuring the third group of component carriers, selecting a third MAC CE version different than the first and second MAC CE versions and a third MAC CE version indicator different than the second MAC CE version indicator, wherein selecting the third MAC CE version indicator comprises toggling the MAC CE version indicator bit from the second MAC CE version indicator value to the first MAC CE version indicator value; and while configured with the third group of component carriers, communicating a third MAC CE using the third MAC CE version and including the third MAC CE version indicator.

Embodiment 82. The method of Embodiment 79 wherein changing comprises incrementing/decrementing a MAC CE version indicator value from a first MAC CE version indicator value to a second MAC CE version indicator value.

Embodiment 83. The method of Embodiment 82 further comprising: after communicating the second MAC CE, configuring a third group of component carriers for the communication link between the wireless terminal and the communication network wherein the third group of component carriers is different than the second group of component carriers; responsive to configuring the third group of component carriers, selecting a third MAC CE version different than second MAC CE version and a third MAC CE version indicator different than the second MAC CE version indicator, wherein selecting the third MAC CE version comprises incrementing/decrementing the MAC CE version indicator bit from the second MAC CE version indicator value to a third MAC CE version indicator value; and while configured with the third group of component carriers, communicating a third MAC CE using the third MAC CE version and including the third MAC CE version indicator.

Embodiment 84. The method of any of Embodiments 75-83 wherein configuring the first group of component carriers comprises configuring the first group of component carriers responsive to receiving a first reconfiguration message from the wireless communication network, and wherein configuring the second group of component carriers comprises configuring the second group of component carriers responsive to receiving a second reconfiguration message from the wireless communication network.

Embodiment 85. The method of Embodiment 84 further comprising: responsive to configuring the second group of component carriers, delaying sending any subsequent MAC CEs of a type of the first and second MAC CEs including the second MAC CE until a delay period has passed and/or until a number of radio frames has passed.

Embodiment 86. The method of Embodiment 84 further comprising: responsive to receiving the second reconfiguration message, transmitting a reconfiguration complete message to the wireless communication network; and responsive to configuring the second group of component carriers, delaying sending any subsequent MAC CEs of a type of the first and second MAC CEs including the second MAC CE until an acknowledgement of the reconfiguration complete message is received from the wireless communication network.

Embodiment 87. The method of any of Embodiments 75-86 wherein communicating the first MAC CE comprises transmitting a first Power Headroom Report (PHR) MAC CE including the first bit map having the first bit map size to the wireless communication network, and wherein communicating the second MAC CE comprises transmitting a second PHR MAC CE including the second bit map having the second bit map size to the wireless communication network.

Embodiment 88. The method of any of Embodiments 75-86 wherein a first Logical Channel Identity, LCID, is provided for the first MAC CE, a second LCID is provided for the second MAC CE, and the first and second LCIDs are the same.

Embodiment 89. A wireless terminal comprising: a transceiver configured to provide radio communications with a wireless communication network over a radio interface; and a processor coupled with the transceiver, wherein the processor is configured to perform operations of any of Embodiments 75-88.

Embodiment 90. A wireless terminal adapted to perform operations of any of Embodiments 75-88.

Embodiment 91. A method of operating a node of a wireless communication network, the method comprising: configuring a first group of component carriers for a communication link between the node of the communication network and a wireless terminal; while configured with the first group of component carriers for the communication link, communicating a first Medium Access Control, MAC, Control Element, CE, over the communication link using a first MAC CE version; after communicating the first MAC CE, configuring a second group of component carriers for the communication link between the node of the communication network and the wireless terminal; and while configured with the second group of component carriers, communicating a second MAC CE, over the communication link using a second MAC CE version different than the first MAC CE version.

Embodiment 92. The method of Embodiment 91 wherein the first MAC CE version defines a first bit map size of a MAC CE, wherein the first MAC CE includes a first bit map having the first bit map size with bits of the first bit map corresponding to respective component carriers of the first group of component carriers, wherein the second MAC CE version defines a second bit map size of a MAC CE different than the first bit map size, and wherein the second MAC CE includes a second bit map having a second bit map size with bits of the second bit map corresponding to respective component carriers of the second group of component carriers.

Embodiment 93. The method of any of Embodiments 91-92 wherein the first MAC CE includes a first MAC CE version indicator, wherein the second MAC CE includes a second MAC CE version indicator, and wherein the first and second MAC CE version indicators are different.

Embodiment 94. The method of any of Embodiments 91-93 wherein configuring the first group of component carriers comprises transmitting a first reconfiguration message to the wireless terminal, and wherein configuring the second group of component carriers comprises transmitting a second reconfiguration message to the wireless terminal.

Embodiment 95. The method of Embodiment 94 further comprising: responsive to transmitting the first reconfiguration message, selecting the first MAC CE version, wherein communicating the first MAC CE comprises receiving the first MAC CE from the wireless terminal and decoding the first MAC CE assuming the first MAC CE version responsive to selecting the first MAC CE version; and responsive to transmitting the second reconfiguration message, selecting the second MAC CE version, wherein communicating the second MAC CE comprises receiving the second MAC CE from the wireless terminal and decoding the second MAC CE assuming the second MAC CE version responsive to selecting the second MAC CE version.

Embodiment 96. The method of Embodiment 94 further comprising: responsive to transmitting the first reconfiguration message, selecting the first MAC CE version, wherein communicating the first MAC CE comprises receiving the first MAC CE from the wireless terminal and decoding the first MAC CE assuming the first MAC CE version responsive to selecting the first MAC CE version; and responsive to transmitting the second reconfiguration message, selecting the second MAC CE version, wherein communicating the second MAC CE comprises receiving the second MAC CE from the wireless terminal, decoding the second MAC CE assuming the second MAC CE version, and decoding the second MAC CE assuming the first MAC CE version responsive to receiving the second MAC CE before completion of a monitoring period after transmitting the second reconfiguration message.

Embodiment 97. The method of Embodiment 96 wherein the first MAC CE includes a first MAC CE version indicator, wherein the second MAC CE includes a second MAC CE version indicator, wherein the first and second MAC CE version indicators are different, and wherein decoding the second MAC CE further comprises using one of the results of decoding the second MAC CE assuming the first and second MAC CE versions based on the MAC CE indicator value of the second MAC CE.

Embodiment 98. The method of any of Embodiments 91-97 wherein communicating the first MAC CE comprises receiving a first Power Headroom Report (PHR) MAC CE including the first bit map having the first bit map size to the wireless communication network, and wherein communicating the second MAC CE comprises receiving a second PHR MAC CE including the second bit map having the second bit map size to the wireless communication network.

Embodiment 99. The method of any of Embodiments 91-98 wherein a first Logical Channel Identity, LCID, is provided for the first MAC CE, a second LCID is provided for the second MAC CE, and the first and second LCIDs are the same.

Embodiment 100. A node of a wireless communication network, the node comprising: a communication interface configured to provide communications with one or more wireless terminals over a radio interface; and a processor coupled with the communication interface, wherein the processor is configured to perform operations of any of Embodiments 91-99.

Embodiment 101. A node of a wireless communication network adapted to perform operations of any of Embodiments 91-99.

Embodiment 102. A wireless terminal, the wireless terminal being adapted to: configure a first group of component carriers for a communication link between the wireless terminal and a communication network; communicate a first Medium Access Control (MAC) Control Element (CE) while configured with the first group of component carriers, wherein the first MAC CE includes a first bit map having a first bit map size with bits of the first bit map corresponding to respective component carriers of the first group of component carriers; configure a second group of component carriers for the communication link between the wireless terminal and the communication network wherein the first group of component carriers is different than the second group of component carriers; and communicating a second MAC CE while configured with the second group of component carriers, wherein the second MAC CE includes a second bit map having a second bit map size with bits of the second bit map corresponding to respective component carriers of the second group of component carriers, and wherein the first bit map size of the first bit map is different than the second bit map size of the second bit map.

Embodiment 103. A node of a wireless communication network, the node being adapted to: configure a first group of component carriers for a communication link between the node of the communication network and a wireless terminal; communicate a first Medium Access Control (MAC) Control Element (CE) over the communication link while configured with the first group of component carriers for the communication link, wherein the first MAC CE includes a first bit map having a first bit map size with bits of the first bit map corresponding to respective component carriers of the first group of component carriers; configure a second group of component carriers for the communication link between the node of the communication network and the wireless terminal; and communicate a second MAC CE over the communication link while configured with the second group of component carriers, wherein the second MAC CE includes a second bit map having a second bit map size with bits of the second bit map corresponding to respective component carriers of the second group of component carriers, and wherein the first bit map size of the first bit map is different than the second bit map size of the second bit map.

Embodiment 104. A wireless terminal comprising: a transceiver configured to provide radio communications with a wireless communication network over a radio interface; and a processor coupled with the transceiver. The processor is configured to: configure a first group of component carriers for a communication link between the wireless terminal and the communication network; communicate a first Medium Access Control (MAC) Control Element (CE) through the transceiver while configured with the first group of component carriers, wherein the first MAC CE includes a first bit map having a first bit map size with bits of the first bit map corresponding to respective component carriers of the first group of component carriers; configure a second group of component carriers for the communication link between the wireless terminal and the communication network wherein the first group of component carriers is different than the second group of component carriers; and communicate a second MAC CE through the transceiver while configured with the second group of component carriers, wherein the second MAC CE includes a second bit map having a second bit map size with bits of the second bit map corresponding to respective component carriers of the second group of component carriers, and wherein the first bit map size of the first bit map is different than the second bit map size of the second bit map.

Embodiment 105. A node of a wireless communication network, the node comprising: a transceiver configured to provide communications with one or more wireless terminals over a radio interface; and a processor coupled with the transceiver. The processor is configured to: configure a first group of component carriers for a communication link between the node of the communication network and a wireless terminal; communicate a first Medium Access Control (MAC) Control Element (CE) over the communication link while configured with the first group of component carriers for the communication link, wherein the first MAC CE includes a first bit map having a first bit map size with bits of the first bit map corresponding to respective component carriers of the first group of component carriers; configure a second group of component carriers for the communication link between the node (BS) of the communication network and the wireless terminal; and communicate a second MAC CE over the communication link while configured with the second group of component carriers, wherein the second MAC CE includes a second bit map having a second bit map size with bits of the second bit map corresponding to respective component carriers of the second group of component carriers, and wherein the first bit map size of the first bit map is different than the second bit map size of the second bit map.

Embodiment 106. A wireless terminal comprising a configuring module and a communication module, wherein the configuring module is arranged for configuring a first group of component carriers for a communication link between the wireless terminal and the communication network, the communication module is arranged for communicating a first Medium Access Control (MAC) Control Element (CE) while configured with the first group of component carriers, wherein the first MAC CE includes a first bit map having a first bit map size with bits of the first bit map corresponding to respective component carriers of the first group of component carriers, the configuring module further arranged for configuring a second group of component carriers for the communication link between the wireless terminal and the communication network wherein the first group of component carriers is different than the second group of component carriers, and the communication module further arranged for communicating a second MAC CE while configured with the second group of component carriers, wherein the second MAC CE includes a second bit map having a second bit map size with bits of the second bit map corresponding to respective component carriers of the second group of component carriers, and wherein the first bit map size of the first bit map is different than the second bit map size of the second bit map.

Embodiment 107. A node of a wireless communication network comprising a configuring module and a communication module, wherein the configuring module is arranged for configuring a first group of component carriers for a communication link between the node of the communication network and a wireless terminal, the communication module is arranged for communicating a first Medium Access Control (MAC) Control Element (CE) over the communication link while configured with the first group of component carriers for the communication link, wherein the first MAC CE includes a first bit map having a first bit map size with bits of the first bit map corresponding to respective component carriers of the first group of component carriers, the configuring module further arranged for configuring a second group of component carriers for the communication link between the node of the communication network and the wireless terminal, and the communication module further arranged for communicating a second MAC CE over the communication link while configured with the second group of component carriers, wherein the second MAC CE includes a second bit map having a second bit map size with bits of the second bit map corresponding to respective component carriers of the second group of component carriers, and wherein the first bit map size of the first bit map is different than the second bit map size of the second bit map.

The configuring module and communition module of a wireless terminal according to Embodiment 106 may at least in one embodiment be implemented as a computer program running on a processor (such as processor 303 of FIG. 13). While a wireless terminal according to Embodiment 106 performs processing according to Embodiment 1, other embodiments of wireless terminals comprising a configuring module and a communication module may perform processing according to any one of Embodiments 2-35.

The configuring module and communition module of a node according to Embodiment 107 may at least in one embodiment be implemented as a computer program running on a processor (such as processor 203 of FIG. 12). While a node of a wireless communication network according to Embodiment 107 performs processing according to Embodiment 38, other embodiments of nodes comprising a configuring module and a communication module may perform processing according to any one of Embodiments 39-72.

Further Definitions:

When an element is referred to as being "connected", "coupled", "responsive", or variants thereof to another element, it can be directly connected, coupled, or responsive to the other element or one or more intervening elements may be present. In contrast, when an element is referred to as being "directly connected", "directly coupled", "directly responsive", or variants thereof to another element, there are no intervening elements present. Like numbers refer to like nodes/elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or", abbreviated "/", includes any and all combinations of one or more of the associated listed items.

As used herein, the terms "comprise", "comprising", "comprises", "include", "including", "includes", "have", "has", "having", or variants thereof are open-ended, and include one or more stated features, integers, nodes, steps, components or functions but do not preclude the presence or addition of one or more other features, integers, nodes, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. Examples of embodiments of aspects of present inventive concepts explained and illustrated herein include their complimentary counterparts. The same reference numerals or the same reference designators denote the same or similar elements throughout the specification.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit (also referred to as a processor) of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BluеRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Other network elements, communication devices and/or methods according to embodiments of inventive concepts will be or become apparent to one with skill in the art upon review of the present drawings and description. It is intended that all such additional network elements, devices, and/or methods be included within this description, be within the scope of the present inventive concepts. Moreover, it is intended that all embodiments disclosed herein can be implemented separately or combined in any way and/or combination.

The invention claimed is:

1. A method of operating a wireless terminal in communication with a wireless communication network, the method comprising:
receiving a first bit map having a first bit map size with individual bits of the first bit map corresponding to respective individual component carriers of a first group of individual component carriers and indicating a status of the respective individual component carriers of the first group;

receiving a second bit map having a second bit map size with individual bits of the second bit map corresponding to respective individual component carriers of a second group of individual component carriers and indicating a status of the respective individual component carriers of the second group, and wherein the first bit map size of the first bit map is different than the second bit map size of the second bit map;

activating/deactivating individual component carriers of the first group of individual component carriers responsive to the first bit map; and activating/deactivating individual component carriers of the second group of individual component carriers responsive to the second bit map.

2. The method of claim 1, wherein receiving the first bit map comprises receiving a first message including the first bit map and receiving a first Identity (ID) associated with the first message, wherein receiving the second bit map comprises receiving a second message including the second bit map and receiving a second ID associated with the second message, and wherein the first and second IDs are different.

3. The method of claim 2 wherein receiving the first message comprises receiving the first message and applying individual bits of the first bit map to respective individual component carriers of the first group of individual component carriers responsive to the first ID, and wherein receiving the second message comprises receiving the second message and applying bits of the second bit map to respective individual component carriers of the second group of individual component carriers responsive to the second ID.

4. The method of claim 1, wherein the first group of individual component carriers includes a first group of secondary individual component carriers, wherein the second group of individual component carriers includes a second group of secondary individual component carriers, wherein the first and second groups of individual secondary component carriers are different, wherein each of the first group of secondary individual component carriers corresponds to a respective individual bit of the first bit map, and wherein each of the second group of secondary individual component carriers corresponds to a respective individual bit of the second bit map.

5. The method of claim 4, wherein a respective individual component carrier index is associated with each secondary individual component carrier of the first group, wherein a respective individual component carrier index is associated with each secondary individual component carrier of the second group, wherein at least one of the individual component carrier indices of the secondary individual component carriers of the first group exceeds a threshold, wherein none of the individual component carrier indices of the secondary individual component carriers of the second group exceeds the threshold, and wherein the first bit map size of the first bit map is greater than the second bit map size of the second bit map.

6. A method of operating a wireless terminal in communication with a wireless communication network, the method comprising:

configuring a group of individual component carriers for a communication link between the wireless terminal and the communication network; and communicating first and second messages, wherein the first message includes a first bit map with bits of the first bit map corresponding to respective individual component carriers of a first sub-set of a group of individual component carriers, and wherein the second message includes a second bit map with bits of the second bit map corresponding to respective individual component carriers of a second sub-set of the group of individual component carriers, wherein the first bit map size of the first bit map is different than the second bit map size of the second bit map;

wherein the group of component carriers is a first group of individual component carriers; and configuring a second group of individual component carriers for a communication link between the wireless terminal and the communication network, wherein the second group of individual component carriers is different than the first group of individual component carriers.

7. The method of claim 6, the method further comprising:

while configured with the second group of individual component carriers, communicating a third message wherein the third message includes a third bit map with bits of the third bit map corresponding to respective individual component carriers of the second group of individual component carriers.

8. The method of claim 7 wherein the first, second, and third bit maps have a same size, wherein the second group of individual component carriers includes a primary individual component carrier and a plurality of secondary individual component carriers, and wherein each of the plurality of secondary individual component carriers corresponds to one of the bits of the third bit map.

9. The method of claim 7 wherein configuring the first group of individual component carriers includes configuring a primary individual component carrier and a group of secondary individual component carriers, wherein the first sub-set of the group of individual component carriers comprises a first sub-set of the group of secondary individual component carriers, and wherein the second sub-set of the group of individual component carriers comprises a second sub-set of the group of secondary individual component carriers.

10. The method of claim 9, wherein configuring the second group of individual component carriers includes configuring a primary individual component carrier without configuring any secondary individual component carriers for the second group.

11. The method of claim 6, wherein the first and second messages are included in a same Protocol Data Unit, PDU.

12. The method of claim 6, wherein the first and second messages are included in a first Protocol Data Unit, PDU, and wherein the third message is included in a second PDU.

* * * * *

UNITED STATES PATENT AND TRADEMARK OFFICE
CERTIFICATE OF CORRECTION

| | |
|---|---|
| PATENT NO. | : 11,082,193 B2 |
| APPLICATION NO. | : 16/558864 |
| DATED | : August 3, 2021 |
| INVENTOR(S) | : Mattias Tan Bergstrom et al. |

It is certified that error appears in the above-identified patent and that said Letters Patent is hereby corrected as shown below:

On the Title Page

Item (72), Inventors
Please correct "Mattias Tan Bergstrom, Stockholm (SE); Riikka Susitaival, Helsinki (FI); Magnus Stattin, Upplands Vasby (SE)"

To read
-- Mattias Tan Bergstrom, Stockholm (SE); Riikka Susitaival, Helsinki (FI) --

Signed and Sealed this
Thirty-first Day of May, 2022

Katherine Kelly Vidal
*Director of the United States Patent and Trademark Office*